US011212656B2

(12) United States Patent
Aggarwal et al.

(10) Patent No.: US 11,212,656 B2
(45) Date of Patent: *Dec. 28, 2021

(54) LIGHTING ELEMENT-CENTRIC NETWORK OF NETWORKS

(71) Applicant: ABL IP HOLDING LLC, Conyers, GA (US)

(72) Inventors: Januk Aggarwal, Alexandria, VA (US); Jason Rogers, Herndon, VA (US); Jack C. Rains, Jr., Sarasota, FL (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 202 days.

This patent is subject to a terminal disclaimer.

(21) Appl. No.: 16/535,356

(22) Filed: Aug. 8, 2019

(65) Prior Publication Data
US 2019/0364650 A1    Nov. 28, 2019

Related U.S. Application Data

(63) Continuation of application No. 15/957,363, filed on Apr. 19, 2018, now Pat. No. 10,383,199, which is a
(Continued)

(51) Int. Cl.
*H04W 4/70* (2018.01)
*H04W 4/80* (2018.01)
(Continued)

(52) U.S. Cl.
CPC .............. *H04W 4/70* (2018.02); *H04B 10/11* (2013.01); *H04B 10/116* (2013.01);
(Continued)

(58) Field of Classification Search
CPC .... H04L 12/2803; H04W 4/008; H04W 4/70; H04W 4/80; H04W 4/90; H04W 52/04;
(Continued)

(56) References Cited

U.S. PATENT DOCUMENTS 4,749,254 A    6/1988  Seaver et al.
5,705,804 A    1/1998  Ramer et al.
(Continued)

FOREIGN PATENT DOCUMENTS

WO    2011121470 A1    10/2011

OTHER PUBLICATIONS

Non Final Office Action for U.S. Appl. No. 15/676,479, dated Dec. 12, 2019, 73 pages.
(Continued)

*Primary Examiner* — Rina C Pancholi
(74) *Attorney, Agent, or Firm* — RatnerPrestia

(57) ABSTRACT

A lighting system utilizes intelligent system elements, such as lighting devices, user interfaces for lighting control or the like and possibly sensors. The system also has a data communication network. Some number of the intelligent lighting system elements, including at least two of the lighting devices, also support wireless communication with non-lighting-system devices at the premises. Each such element has a communication interface system configured to provide a short range, low power wireless data communication link for use by non-lighting-system devices at the premises in proximity to the respective intelligent system element. Also, in such an element, the processor is configured to control communications via the communication interface system so as to provide access to the data network and through the data network to the wide area network outside the premises for non-lighting related communications of the non-lighting-system devices.

20 Claims, 7 Drawing Sheets

Related U.S. Application Data continuation of application No. 13/964,564, filed on Aug. 12, 2013, now Pat. No. 9,980,351.

(51) Int. Cl.

| | |
|---|---|
| *H05B 47/19* | (2020.01) |
| *H05B 47/18* | (2020.01) |
| *H05B 47/175* | (2020.01) |
| *H04L 12/28* | (2006.01) |
| *H04W 52/04* | (2009.01) |
| *H04B 10/11* | (2013.01) |
| *H04B 10/116* | (2013.01) |
| *H04W 4/90* | (2018.01) |
| *H05B 47/105* | (2020.01) |

(52) U.S. Cl.
CPC ........... *H04L 12/2803* (2013.01); *H04W 4/80* (2018.02); *H04W 52/04* (2013.01); *H05B 47/175* (2020.01); *H05B 47/18* (2020.01); *H05B 47/19* (2020.01); *H04W 4/90* (2018.02); *H05B 47/105* (2020.01); *Y02B 20/40* (2013.01); *Y02D 30/70* (2020.08)

(58) Field of Classification Search
CPC ........... H05B 37/0254; H05B 37/0272; H05B 37/0227; H05B 37/0245; H04B 10/11; H04B 10/116; Y02B 20/48; Y02D 70/00; Y02D 70/142; Y02D 70/144; Y02D 70/162; Y02D 70/164; Y02D 70/166; Y02D 70/22
See application file for complete search history.

(56) References Cited

U.S. PATENT DOCUMENTS

| | | | |
|---|---|---|---|
| 5,769,527 A | 6/1998 | Taylor et al. | |
| 5,877,490 A | 3/1999 | Ramer et al. | |
| 5,914,487 A | 6/1999 | Ramer et al. | |
| 6,009,455 A | 12/1999 | Doyle | |
| 6,043,873 A | 3/2000 | Ramer et al. | |
| 6,363,434 B1 | 3/2002 | Eytchison | |
| 6,458,967 B1 | 10/2002 | Detty et al. | |
| 6,548,967 B1* | 4/2003 | Dowling ............... | H04B 10/114 |
| | | | 315/318 |
| 7,003,547 B1 | 2/2006 | Hubbard | |
| 7,202,613 B2 | 4/2007 | Morgan et al. | |
| 7,333,903 B2 | 2/2008 | Walters et al. | |
| 7,546,167 B2 | 6/2009 | Walters et al. | |
| 7,555,300 B2 | 6/2009 | Scheinert et al. | |
| 7,925,384 B2 | 4/2011 | Huizenga et al. | |
| 8,130,371 B2 | 3/2012 | Imura | |
| 8,140,276 B2 | 3/2012 | Walters et al. | |
| 8,547,036 B2 | 10/2013 | Tran | |
| 8,614,766 B1 | 12/2013 | Clark | |
| 8,732,031 B2 | 5/2014 | Martin et al. | |
| 8,749,146 B2 | 6/2014 | Jones | |
| 8,755,039 B2 | 6/2014 | Ramer | |
| 8,829,821 B2 | 9/2014 | Chobot et al. | |
| 9,137,879 B2 | 9/2015 | Rains et al. | |
| 9,204,523 B2 | 12/2015 | Reed et al. | |
| 9,980,351 B2* | 5/2018 | Aggarwal ............ | H05B 47/175 |
| 10,383,199 B2* | 8/2019 | Aggarwal ............ | H04W 4/80 |
| 2002/0016639 A1 | 2/2002 | Smith et al. | |
| 2003/0101459 A1 | 5/2003 | Edson | |
| 2004/0036006 A1 | 2/2004 | Dowling | |
| 2004/0052076 A1 | 3/2004 | Mueller et al. | |
| 2005/0035728 A1 | 2/2005 | Schanberger et al. | |
| 2006/0075407 A1 | 4/2006 | Powers et al. | |
| 2006/0075408 A1 | 4/2006 | Powers et al. | |
| 2007/0045524 A1 | 3/2007 | Rains et al. | |
| 2007/0268687 A1 | 11/2007 | Scannell | |
| 2008/0071933 A1 | 3/2008 | Nonaka et al. | |
| 2008/0215391 A1 | 9/2008 | Dowling et al. | |
| 2008/0265799 A1 | 10/2008 | Sibert | |
| 2009/0051506 A1 | 2/2009 | Hicksted | |
| 2009/0143044 A1 | 6/2009 | Thorson et al. | |
| 2009/0299527 A1 | 12/2009 | Huizenga et al. | |
| 2010/0114340 A1 | 5/2010 | Huizenga et al. | |
| 2010/0176733 A1 | 7/2010 | King | |
| 2010/0259931 A1 | 10/2010 | Chemel et al. | |
| 2010/0301769 A1 | 12/2010 | Chemel et al. | |
| 2011/0021143 A1 | 1/2011 | Kapur et al. | |
| 2011/0199004 A1 | 8/2011 | Henig et al. | |
| 2012/0002406 A1 | 1/2012 | Leadford et al. | |
| 2012/0013257 A1 | 1/2012 | Sibert | |
| 2012/0019162 A1* | 1/2012 | Budike, Jr. ............ | H05B 47/19 |
| | | | 315/291 |
| 2012/0025717 A1 | 2/2012 | Klusmann et al. | |
| 2012/0037725 A1 | 2/2012 | Verfuerth | |
| 2012/0040606 A1 | 2/2012 | Verfuerth | |
| 2012/0044350 A1 | 2/2012 | Verfuerth | |
| 2012/0086561 A1 | 4/2012 | Ilyes et al. | |
| 2012/0130548 A1 | 5/2012 | Fadell et al. | |
| 2012/0217880 A1 | 8/2012 | Nieuwlands et al. | |
| 2012/0229048 A1 | 9/2012 | Archer | |
| 2012/0235579 A1 | 9/2012 | Chemel et al. | |
| 2012/0299486 A1 | 11/2012 | Birru | |
| 2013/0159754 A1 | 6/2013 | Wendt | |
| 2013/0234598 A1 | 9/2013 | Bora et al. | |
| 2013/0293112 A1 | 11/2013 | Reed et al. | |
| 2013/0293155 A1 | 11/2013 | Campbell et al. | |
| 2013/0320861 A1 | 12/2013 | Sinai et al. | |
| 2014/0001959 A1 | 1/2014 | Motley et al. | |
| 2014/0035482 A1 | 2/2014 | Rains et al. | |
| 2015/0256665 A1* | 9/2015 | Pera .................. | H04M 1/72415 |
| | | | 455/420 |
| 2016/0323977 A1* | 11/2016 | Sun ........................ | H05B 47/11 |

OTHER PUBLICATIONS

Non Final Office Action for U.S. Appl. No. 16/707,289, dated Jan. 17, 2020, 10 pages.
Notice of Allowance for U.S. Appl. No. 16/707,289, dated Feb. 20, 2020, 27 pages.
Notice of Allowance for U.S. Appl. No. 15/177,782, dated Mar. 18, 2020, 21 pages.
Final Office Action for U.S. Appl. No. 15/676,479, dated Mar. 26, 2020, 15 pages.
Notice of Allowance for U.S. Appl. No. 15/974,250, dated Mar. 27, 2020, 76 pages.
Notice of Allowance for U.S. Appl. No. 15/365,087, dated Jun. 17, 2019, 12 pages.
Final Office Action for U.S. Appl. No. 15/357,162, dated Mar. 5, 2019, 47 pages.
Final Office Action for U.S. Appl. No. 15/365,087, dated Apr. 4, 2019, 55 pages.
Notice of Allowance for U.S. Appl. No. 15/720,546, dated Dec. 19, 2018, 23 pages.
Non Final Office Action for U.S. Appl. No. 15/720,546, dated Aug. 31, 2018, 10 pages.
Non Final Office Action for U.S. Appl. No. 15/720,546, dated Oct. 30, 2017, 11 pages.
Non-Final Office Action, dated May 2, 2017, issued in U.S. Appl. No. 15/228,463, filed Aug. 4, 2016, 22 pages.
Non-Final Office Action, dated Feb. 10, 2017, issued in U.S. Appl. No. 15/363,526, filed Nov. 29, 2016, 17 Pages.
Non-Final Office Action, dated Nov. 17, 2016, issued in U.S. Appl. No. 15/259,612, filed Sep. 8, 2016), 16 pages.
Non-Final Office Action, dated Jun. 23, 2016, issued in U.S. Appl. No. 13/971,194, filed Aug. 20, 2013, 19 pages.
Final Office Action dated May 3, 2017, issued in U.S. Appl. No. 15/363,526, filed Nov. 29, 2016, 19 pages.
Notice of Allowance for U.S. Appl. No. 15/228,463, dated Sep. 13, 2017,18 pages.
Notice of Allowance for U.S. Appl. No. 15/363,526, dated Jul. 14, 2017,15 pages.
Notice of Allowance for U.S. Appl. No. 15/259,612, dated Jun. 5, 2017, 11 pages.

(56) References Cited

OTHER PUBLICATIONS

Notice of Allowance for U.S. Appl. No. 15/259,612, dated Feb. 1, 2017, 12 pages.
Notice of Allowance for U.S. Appl. No. 13/971,194, dated Oct. 24, 2016, 16 pages.
Non-Final Office Action for U.S. Appl. No. 15/365,087, dated Sep. 20, 2018, 62 pages.
Official Action for European Patent Application No. 14 835 987.0, dated Sep. 26, 2018, 15 pages.
Non-Final Office Action for U.S. Appl. No. 15/357,162, dated Aug. 24, 2018, 57 pages.
Davies, C., "Philips hue Review", SlashGear; http://slashgear.com/philips-hue-review-07255995/; Nov. 7, 2012, London, United Kingdom, 13 pages.
Extended European Search Report for European Application No. 14 835 987.0, dated May 3, 2017, 12 pages.
Final Office Action, dated Nov. 19, 2015, issued in U.S. Appl. No. 14/219,657, filed Mar. 19, 2014, 59 pages.
Final Office Action, dated Dec. 10, 2015, issued in U.S. Appl. No. 14/507,222, filed Oct. 6, 2014, 63 pages.
International Search Report and Written Opinion for International Application No. PCT/US2013/037968, dated Jul. 2, 2013, 9 pages.
International Search Report and Written Opinion for International Application No. PCT/US2013/050520, dated Nov. 20, 2014, 10 pages.
Non-Final Office Action, dated Jun. 1, 2016, issued in U.S. Appl. No. 14/507,222, filed Oct. 6, 2014, 54 pages.
Notice of Allowance for U.S. Appl. No. 13/903,428, dated Apr. 5, 2016, 32 pages.
Notice of Allowance for U.S. Appl. No. 14/219,657, dated Mar. 18, 2016, 20 pages.
Notice of Allowance for U.S. Appl. No. 14/507,222, dated Nov. 25, 2016, 36 pages.
"Introducing Philips Hue: The World's Smartest LED Bulb, Marking a New Era in Home Lighting", Philips Sense and Simplicity; http://newscenter/philips.com/main/standard/news/press/2012/20121029, Oct. 29, 2012, Amsterdam, The Netherlands, 3 pages.
"Raspberry Pi a $30 Computer Set to Revolutionize the Teaching of Computing"; Silverfish hubpages; http://silver-fish.hubpages.com/hub/Raspberry-Pi-a-30-Computer; Aug. 15, 2012, 4 pages.
International Search Report and Written Opinion for International Application No. PCT/US2013/050657, dated Jan. 9, 2014. 10 pages.
Non-Final Office Action, dated Feb. 25, 2016, issued in U.S. Appl. No. 13/971,428, filed Aug. 20, 2013, 16 pages.
Non Final Office Action dated Mar. 30, 2015, issued in U.S. Appl. No. 14/507,222, filed Oct. 6, 2014, 60 pages.
Non Final Office Action dated Mar. 26, 2015, issued in U.S. Appl. No. 14/219,657, filed Mar. 19, 2014, 58 pages.
Non-Final Office Action dated Mar. 20, 2015, issued in U.S. Appl. No. 13/964,564, filed Aug. 12, 2013, 44 pages.
Non-Final Office Action issued in U.S. Appl. No. 13/971,194, dated Dec. 9, 2015, 20 Pages.
Non-Final Office Action, dated Jun. 3, 2016, issued in U.S. Appl. No. 13/964,564, filed Aug. 12, 2013, entitled "Lighting Element-Centric Network of Networks," 48 pages.
Final Office Action dated Nov. 20, 2015 in U.S. Appl. No. 13/964,564, filed Aug. 12, 2013, 51 pages.
Final Office Action for U.S. Appl. No. 13/964,564, dated Oct. 21, 2016, 50 pages.
Non-Final Office Action, issued in U.S. Appl. No. 13/964,564, dated Mar. 9, 2017, 47 pages.
Final Office Action for U.S. Appl. No. 15/720,546, dated Apr. 30, 2018, 20 pages.
Notice of Allowance for U.S. Appl. No. 13/964,564, dated Jan. 23, 2018, 25 pages.
Final Office Action for U.S. Appl. No. 13/964,564, dated Sep. 22, 2017, 49 pages.
Notice of Allowance for U.S. Appl. No. 16/366,436, dated Aug. 30, 2019, 8 pages.
Non Final Office Action for U.S. Appl. No. 15/177,782, dated Sep. 9, 2019, 76 pages.
Entire patent prosecution history of U.S. Appl. No. 15/957,363, filed Apr. 19, 2018, entitled, "Lighting Element-Centric Network of Networks" now U.S. Pat. No. 10,383,199, issued Aug. 13, 2019.
Entire patent prosecution history of U.S. Appl. No. 13/964,564, filed Aug. 12, 2013, entitled, "Lighting Element-Centric Network of Networks" now U.S. Pat. No. 9,980,351, issued May 22, 2018.
U.S. Appl. No. 13/463,594, filed May 3, 2012, entitled "Lighting Devices With Integral Sensors for Detecting One or More External Conditions and Networked System Using Such Devices."
Notice of Allowance for U.S. Appl. No. 15/676,479, dated May 13, 2020, 16 pages.

\* cited by examiner

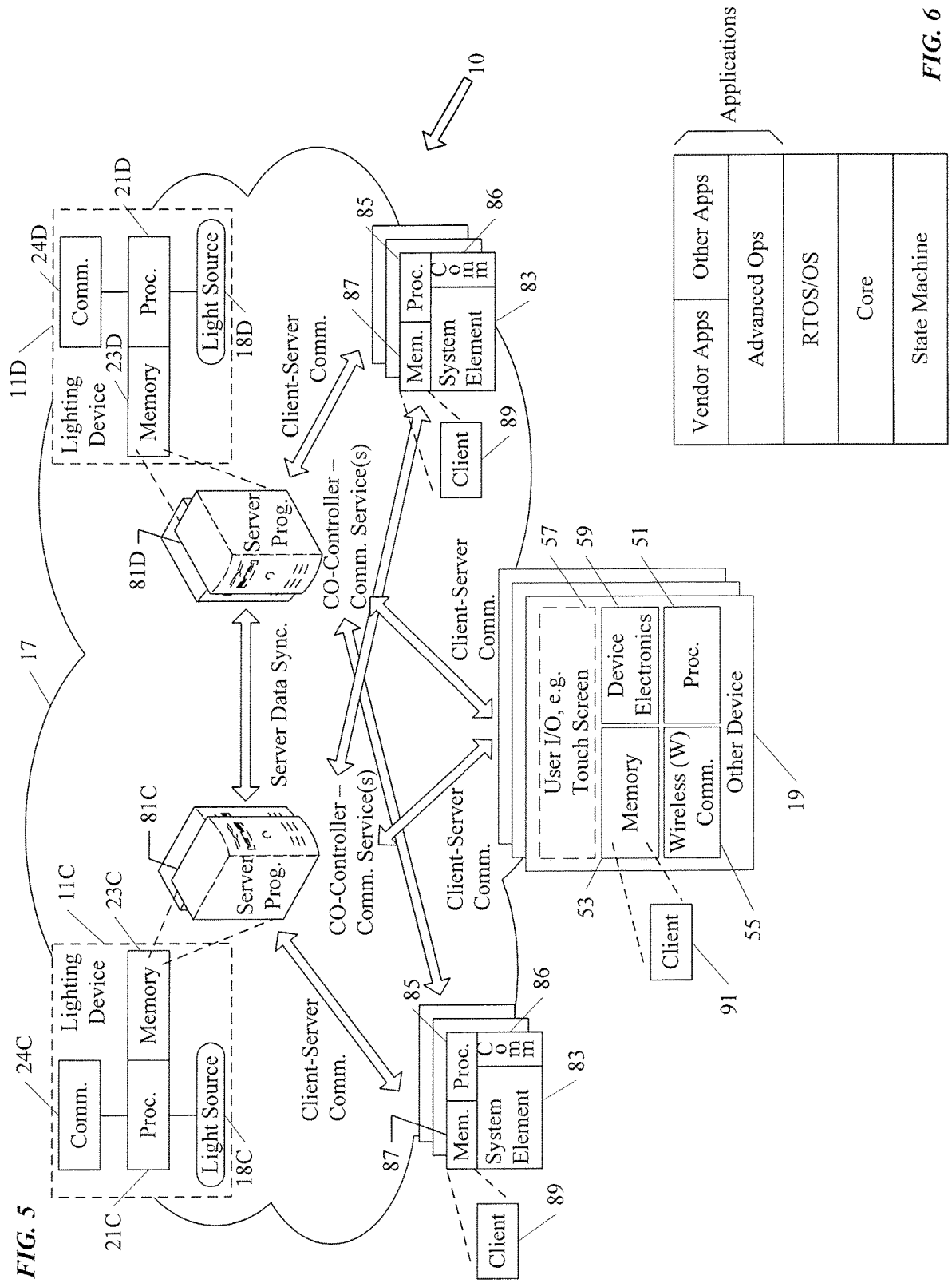

LIGHTING ELEMENT-CENTRIC NETWORK OF NETWORKS

RELATED APPLICATIONS

This application is a continuation of U.S. application Ser. No. 15/957,363, Filed Apr. 19, 2018, now U.S. Pat. No. 10,383,199, Issued Aug. 13, 2019, entitled "LIGHTING ELEMENT-CENTRIC NETWORK OF NETWORKS," the disclosure of which is entirely incorporated herein by reference.

U.S. application Ser. No. 15/957,363 is a continuation of U.S. application Ser. No. 13/964,564, Filed Aug. 12, 2013, now U.S. Pat. No. 9,980,351, Issued May 22, 2018, entitled "LIGHTING ELEMENT-CENTRIC NETWORK OF NETWORKS," the disclosure of which is entirely incorporated herein by reference.

This application also is related to U.S. application Ser. No. 13/903,330, Filed May 28, 2013, now U.S. Pat. No. 8,928,232, Issued Jan. 6, 2015, entitled "LIGHTING NETWORK WITH AUTONOMOUS COMMISSIONING," the disclosure of which is entirely incorporated herein by reference.

This application also is related to U.S. application Ser. No. 13/903,428, Filed May 28, 2013, now U.S. Pat. No. 9,504,132 Issued Nov. 22, 2016, entitled "DISTRIBUTED PROCESSING USING RESOURCES OF INTELLIGENT LIGHTING ELEMENTS OF A LIGHTING SYSTEM," the disclosure of which is entirely incorporated herein by reference.

TECHNICAL FIELD

The examples discussed below relate to lighting systems, system elements and components thereof, wherein the system includes network interconnectivity of the lighting system elements as well as wireless communication for other devices or equipment that may communicate with or through the lighting system elements and the network communications media of the lighting system for other non-lighting purposes.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use.

Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often traditional lighting devices are controlled individually or as relatively small groups at separate locations.

With the advent of modern electronics has come advancement, including advances in the types of light sources as well as advancements in networking and control capabilities of the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. As increased processing capacity finds its way into the lighting devices, it becomes relatively easy to incorporate associated communications capabilities, e.g. to allow lighting devices to communicate with system control elements and/or with each other. In this way, advanced electronics in the lighting devices as well as the associated control elements have facilitated more sophisticated lighting control algorithms as well as increased networking of lighting devices.

There also have been various other initiatives to provide communication networks and automation throughout a home other type of building. For example, today, many buildings and/or enterprise campuses include local area data communication networks. Increasingly, some of these installations support communications for automated control and/or monitoring purposes, which may use the data network or other communication media in support of control and/or monitoring functions. For example, a building control and automation system may allow personnel of an enterprise to communicate with and control various systems, such as heating-air conditioning and ventilation (HVAC) equipment, at one or more enterprise premises. For home automation, applications are now available to allow a user to operate a mobile device (e.g. smartphone or tablet) to communicate with and control smart devices in the home, such as appliance, HVAC and audio-visual systems. To the extent that these developments in communication and automation have considered lighting, they have only included the lighting related elements as controlled outputs (e.g. to turn ON/OFF or otherwise adjust lighting device output) and in a few cases as sensed condition inputs (e.g. to receive data from light level or room occupancy type sensor devices). The focus of such communication networks or automation systems has instead centered around other perspectives, such as around control of HVAC or other major enterprise systems and/or around the relevant user/data communications aspects (e.g. mobile devices and associated applications).

Conversely, as more and more devices become intelligent and may utilize data communications in support of new features and functions, the demand on data communication media within the premises skyrockets. Traditional networking, utilizing hard links such as various types of electrical wiring or optical cables, is often expensive to install and may not be practical in many premises. Even if installed within a premises, it may not be particularly easy to connect new devices at different locations to the existing media and/or to move devices about the premises and still readily connect to the on-premises network media.

Wireless media offer increased flexibility and/or mobility. However, as more and more of our everyday objects become connected and start using wireless communication, the available radio spectrum is quickly becoming saturated.

There is room for further improvement.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 5 is an alternative diagram of selected aspects of the system of FIG. 1, representing an example of multiple-instance server type of distributed processing.

FIG. 6 is a stack diagram useful in explaining example of program configuration.

DETAILED DESCRIPTION

Figure 1:
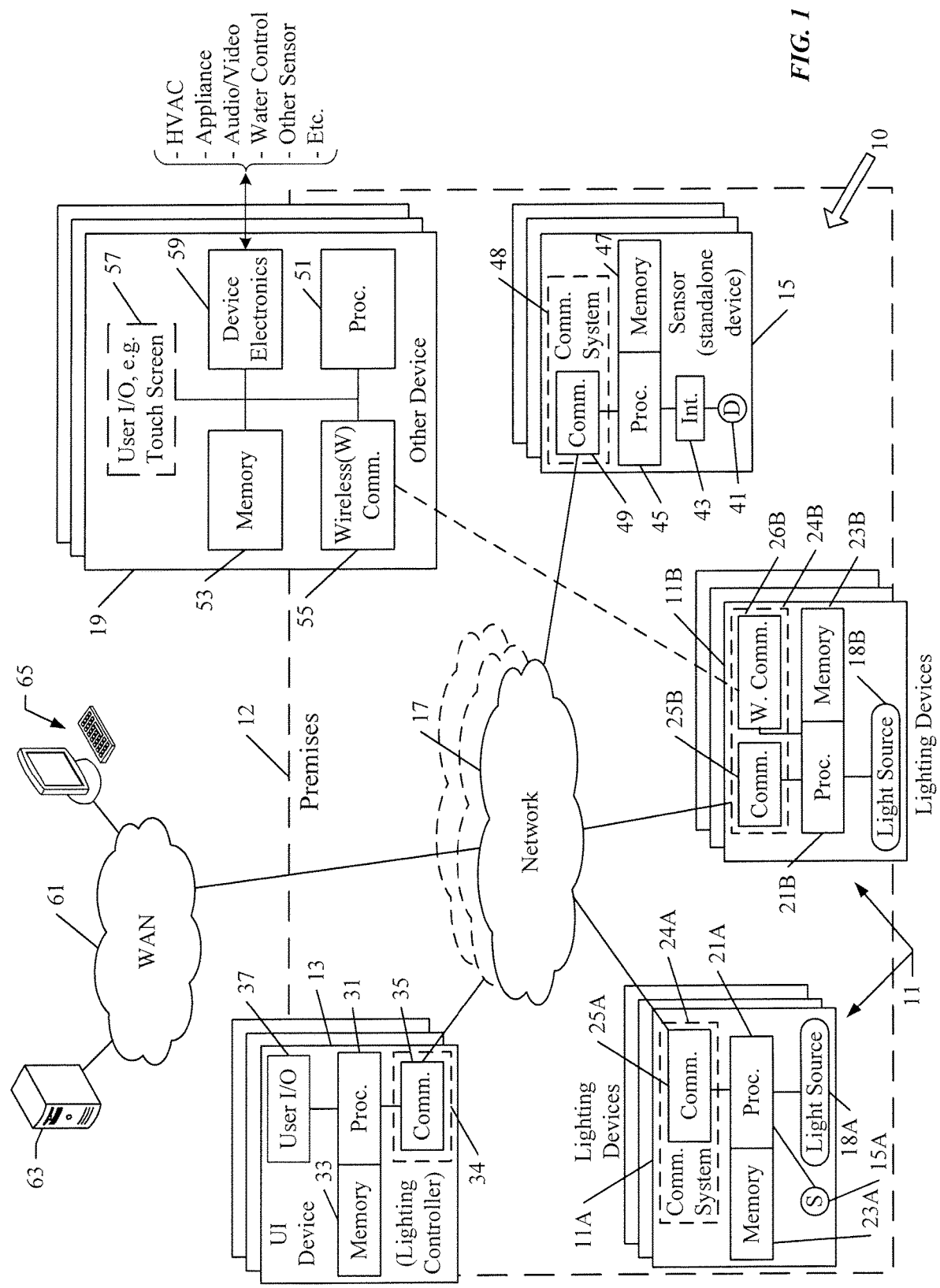
FIG. 1 is a functional block diagram of a simple example of a system having intelligent lighting devices and other intelligent system elements for lighting related functions linked or networked for data communications, which also supports network communications with a wide range of other devices or equipment inside and/or outside the premises via wireless links with the intelligent lighting system elements.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Each of the various examples of a lighting system discussed below and shown in the drawings includes or connects to media to form a data communication network within the premises. The network provides data communications for equipment at the premises and will often provide access to a wider area data network extending outside the premises, for example to an intranet or to a wide area network such as or providing access to the public Internet. Such a system also includes intelligent lighting system elements that communicate with each other via the network and/or through the network with external networks and/or other systems/devices. However, at least some of the intelligent lighting system elements at the premises also are configured to provide wireless data network access for other (non-lighting-system) devices within the premises serviced by the lighting system.

The intelligent lighting system elements include a number of lighting devices, at least one light controller for a lighting-related user interface (e.g. analogous to a wall panel) and/or at least one standalone lighting-related sensor. Each of the intelligent lighting system elements has a communication interface system configured to provide data communication via a link to the system's data network. In the examples, the communication interface system in a number of the intelligent lighting system elements, e.g. in two or more intelligent lighting devices, also supports wireless data communication with other devices in the vicinity.

As more and more of our everyday objects become connected, it is often desirable that such other non-lighting-system devices use wireless communication. However, with increased wireless usage, the available radio spectrum may quickly become saturated. In principle, there are several ways to increase the number of connected devices. For example, it may be possible to increase the number of available channels, e.g. to increase the amount of available spectrum or to increase the number of channels within a given spectrum range. Neither of these options may be viable given existing standards and regulatory conditions. Another option is to limit the physical distance that any given signal can propagate so that the same channel can be used in multiple physical locations simultaneously. A common way of achieving this distance-limited approach is to limit the power of the transmitters of the various wireless capable devices so each wireless signal attenuates to within noise levels over a relatively short distance. However, distance limitations may be too restrictive in some installations unless it is feasible to also install more wireless access points or the like within the short range of all the devices needing data communication access within the premises. Installation of wireless access points, particularly in large numbers also may be complicated and expensive, e.g. to provide power and a network link to each such access point.

However, lighting at a premises is a common installation. Most if not all of the lighting devices at a premises will have a mains power connection to provide the power for the light source. User interface devices and lighting related sensors may also have connections to the power mains at the premises. In a system like that under consideration here, the lighting system elements also have links into the data communication network at the premises. Stated another way, once the lighting system is installed, power and data communication capabilities will extend to most if not all of the intelligent elements of the lighting system. In many such premises, there will be any number of such lighting devices and a controller and/or a sensor in every room, corridor or other type of area at the premises. Stated another way, there will be a fairly substantial number of intelligent lighting system elements, with power and data communication capability deployed about the premises. Such intelligent lighting system elements therefore provide a suitable location for addition of elements in support of wireless data communication at the premises, e.g. without the need for separate data network links or power connections for separately installed wireless access points.

Hence, in the examples of the system as discussed below, each of some number of the intelligent lighting system elements has a communication interface that supports wireless communication with other devices by providing a relatively short range, low power wireless link for use by other/non-lighting-system devices in proximity to the intelligent system element. The processor of such a wireless capable intelligent system element is configured to control communications via the communication interface system to provide access to the data network of the lighting system and through that data network to the wider area network outside the premises, for non-lighting-system related communications of the other devices.

The processor of the lighting system element supporting wireless communication for non-lighting-system devices may also permit some data communications of such another device within range with the system element itself or with other intelligent lighting system elements. This type of communication with one or more system elements (as opposed to access to a wider area data network), for example, may support commissioning of other devices on the system and/or allow intelligent lighting system elements to provide some data processing service(s) in support of operations of the other devices on the premises (if deemed appropriate and/or if such services(s) would not compromise system security).

Reference now is made in detail to the examples illustrated in the accompanying drawings and discussed below.

FIG. 1 is a high-level block diagram of a networked lighting system 10, many elements of which are installed at a premises 12. The premises 12 may be any location or locations serviced for lighting and other purposes by a networked intelligent lighting system of the type described herein. Most of the examples discussed below focus on building installations, for convenience, although the system may be readily adapted to outdoor lighting. Hence, the example of system 10 provides lighting and possibly other services in a number of service areas in or associated with a building, such as various rooms, hallways, corridors or storage areas of a building and an outdoor area associated with a building. Any building forming or at the premises, for example, may be an individual or multi-resident dwelling or may provide space for one or more enterprises and/or any combination of residential and enterprise facilities.

The lighting system elements, in a system like system 10 of FIG. 1 may include any number of lighting devices 11, such as fixtures and lamps, as well as lighting controllers, such as switches dimmers and smart control panels. The lighting controllers may be implemented by intelligent user interface devices 13, although intelligent user interface devices on the system 10 may serve other purposes. The lighting system elements may also include one or more sensors used to control lighting functions, such as occupancy sensors, ambient light sensors and light or temperature feedback sensors that detect conditions of or produced by one or more of the lighting devices. If provided, the sensors may be implemented in intelligent standalone system elements 15, or the sensors may be incorporated in intelligent lighting devices, e.g. as an enhanced capability of a lighting device, or in UI devices. The lighting system elements 11, 13, 15, in a system like system 10 of FIG. 1, are coupled to and communicate via a data network at the premises 12. A system like that shown in the drawing may incorporate or at least provide communication capabilities or services for use by other (non-lighting-system) devices 19 within the premises 12.

Hence, in our example, each room or other type of lighting service area illuminated by the system 10 includes a number of lighting devices 11 as well as other system elements such as one or more user interface (UI) devices 13 each configured as a lighting controller or the like and/or one or more sensors. In the example, some lighting devices 11A are enhanced by the inclusion of a sensor 15A. However, sensors also may be provided as standalone system elements as shown at 15. As will be discussed more later, lighting devices 11B include wireless communication interfaces to provide wireless data communication access for other devices 19 within wireless range.

Although not shown for convenience, some lighting devices 11 may not have a sensor and may not support the wireless communication for other devices 19. Conversely, some lighting devices 11 may have both a sensor and the additional wireless communication capability. For example, in some areas or premises, wireless communication access provided by some but not all system elements may be sufficient to serve the expected number of other devices 19 in the particular area or premises. As another example, there may be some areas at a particular premises where it is desirable to have wireless coverage while there are other areas at the premises in which wireless coverage is deemed undesirable or unnecessary. Alternatively, all of the lighting devices 11 at a given premises 12 may support wireless communication for other devices 19.

A room or other service area will often have an appropriate number of lighting devices 11, for example, to provide a desired level of lighting for the intended use of the particular space. In many installations, the equipment in the service area also includes a user interface (UI) device, which in this example, serves as a first lighting controller 13. In a similar fashion, the equipment in the service area may include one or more sensors, each of which may be in or closely associated with one of the lighting devices 11A as represented by the sensor 15A or may be a standalone device such as 15. Examples of lighting operation related sensors include occupancy sensors and sensors of one or more light characteristics (e.g. for sensing level and/or color characteristic(s) of ambient light in the service area and/or of light produced in or output by one or more of the lighting devices 11 that illuminates the service area). Other sensors may detect other conditions that are relevant to other functions of the system or for more general communication about conditions in an area for still further purposes, such as temperature or humidity for HVAC control or vibration for reporting of earthquakes or similar events, microphones, still or video cameras, directional optical sensors such as a quadrant hemispherical light detector or "QHD" (see e.g. U.S. Pat. Nos. 5,877,490 and 5,914,487), etc. Other examples of conditions that may be detected by appropriate sensors include a security condition, an accident/collision detection, an object/occupant identification, etc. Different sensors for different types or sets of conditions may be relevant in different system installations, e.g. some of these examples might be more relevant in warehouse type system applications. Sensors for such other non-lighting related conditions could be provided as part of lighting system 10 in a manner similar to 15, 15A, for example, if offered by the entity selling/installing the system 10 at the premises 12. For purposes of further discussion of FIG. 1, however, we will focus of implementations that include sensors for purposes related to lighting operations of the system 10; and in such system implementation, any sensors for other non-lighting related conditions will be implemented in some of the other devices 19.

For lighting operations, the lighting system elements for a given service area (11, 13 and/or 15) are coupled together for network communication with each other through data communication media to form a portion of a physical data communication network. Similar elements in other service areas of the premises are coupled together for network communication with each other through data communication media to form one or more other portions of the physical data communication network at the premises 12. The various portions of the network in the service areas in turn are coupled together to form a data communication network at the premises, for example to form a local area network (LAN) or the like, as generally represented by the cloud 17 in the drawing. In many installations, there may be one overall data communication network 17 at the premises. However, for larger premises and/or premises that may actually encompass somewhat separate physical locations, the premises-wide network 17 may actually be built of somewhat separate but interconnected physical networks represented by the dotted line clouds.

A system like that of FIG. 1 may be used for communications with other devices 19 within the premises 12 as well as with lighting system related equipment and a wide range of other entities/equipment outside the premises 12. Effectively, the lighting system becomes a communication hub providing data communication access, for other types of devices and those wanting to communicate therewith.

Light fixtures will typically have power. Other system elements, such as the user interface devices and/or any standalone lighting sensors will also typically have power. In a system like that of FIG. 1, such intelligent elements also have network connectivity, for data communication access to the network 17 and through that network 17 to other networks on and/or outside the premises 12. In addition to lighting elements such as 11, 13 and 15, many other devices at any given premises 12 are intelligent and configured to utilize data communication networking. A separate network for such devices could be provided, however, that incurs additional cost for equipment and installation. Hence, the other devices 19 in the example of system utilize the same network 17. Although the other devices 19 could link directly to the network 17, the example of the system 10 utilizes wireless data communication to one or more of the lighting elements such as 11, 13 and 15 that include wireless data communication interfaces.

Wired connections to the network 17 may tend to be expensive and limit the location and mobility of such other devices within the premises. Direct wireless communication with the network 17 may be feasible in some premises and/or at some locations on a particular premises. However, as outlined earlier, to service large numbers of devices within a given premises, particularly without undue restrictions on location or mobility within the premises, the devices may often need to operate at low power levels and thus communicate wirelessly over short distances.

Since installation of the lighting system 10 creates a permanent and pervasive communication network throughout a facility or space, it would be beneficial to use this network to deploy many low-power radio transducers (e.g. pico or femto cells, WiFi hotspots, etc.) throughout the area served by the lighting system. In this way, devices sold/installed by other parties and/or any devices using radio communications could potentially use much lower power and therefore allow many more devices to work in a building or other space.

Hence, some or all of the lighting devices 11 and possibly one or more of the lighting controllers 13 and/or standalone lighting related sensors 15 include wireless data communication interfaces. Although the interfaces may utilize readily available standardized wireless communication technologies, the wireless interfaces as well as compatible devices within the premises will typically operate at a relatively low power. However, because there are sufficient wireless access nodes provided by the lighting system elements there is sufficient coverage throughout a substantial portion and possibly all of the premises 12 to allow other devices in the various areas of the premises to wirelessly communicate through the those lighting system elements and the backbone data network 17 of the lighting system 10.

The lighting system 10 may also support autonomous discovery and commissioning. Although such discovery and commissioning amongst the system elements 11, 13, 15 may be particularly useful in system set-up, some aspects may also apply to allowing other devices 19 to communicate with or through the system 10. For example, lighting devices 11 and/or other intelligent system elements 13 or 15 may be configured to autonomously discover other devices 19 and commission discovered devices at least to the extent appropriate to permit the access to the system's data network 17 and through that network to the WAN 61 outside the premises for non-lighting related communications of the other devices.

The networking within the premises 12 includes both physical and logical arrangements. For example, a network within a room or other service area for the lighting elements 11, 13, 15 also provides physical network data communication capabilities for other devices 19 within the room or other service area. The lighting elements 11, 13, 15 in a service area also will typically be logically grouped together, e.g. for coordinated lighting of the room or other type of service area. However, various sets of the lighting elements 11, 13, 15 throughout a premises 12 may be logically grouped together, in various ways for different purposes, e.g. all sensors of a particular type, all lighting devices on each floor or on a particular side of a building, etc. Much as with the lighting system elements 11, 13, 15, the other elements 19 can be logically grouped together to form logical sub-networks, based on a variety of logical relationships. For example, devices by a particular manufacturer may be logically grouped and allowed to communicate with external equipment of or associated with that manufacturer (e.g. of the manufacturer's service department or of a service contractor for the manufacturer). As another example, sensors of a particular type deployed as other devices may be grouped together and configured to report to an interested authorized entity, e.g. vibration sensors providing data to a national geographic survey institute for earthquake related reporting and/or to a building maintenance organization to report vibration from local events/sources (machinery, traffic, etc.).

The wireless communication and network aspects of the system 10 enable other devices to access and communicate through the wide area network 61 outside the premises 12. In some examples of arrangements of the system 10, at least some type(s) of other devices 19 also may communicate with intelligent lighting system elements 11, 13, 15 at the premises for processing in support of the operation(s) of such other devices. For example, for some functions associated with the other devices 19, one or more of the intelligent lighting system elements 11, 13, 15 may operate as a server with respect to client functionality in the other devices(s) 19. For example, the server functionality may work as a central overseer (CO) to assist in set-up of devices 19 on the system 10 and/or provide intermediate functions between the devices 19 and equipment outside the premises (e.g. server relative to the device client functions in the premises, and either client with respect to an external server or server with respect to an external client terminal). Depending on the functionality and/or the processing load required for the functionality supported in the lighting system element(s), a number of the intelligent lighting system elements may be configured to perform the processing operation to support an operation of a processor of other device(s) 19 in a distributed processing manner using processing and/or memory resources of each of some number of the intelligent lighting system elements. The distributed processing may be implemented as distributed instances of server software/functions, and/or the distributed processing may be implemented as resource sharing amongst the involved intelligent lighting system elements.

It may be helpful next to consider examples of the structures of the intelligent lighting system elements (11, 13, 15) in a bit more detail, albeit at a relatively high, functional level. In that regard, we first consider the lighting devices.

The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. A lighting device, for example, may take the form of a lamp, light fixture or other luminaire that incorporates a source, where the source by itself contains no intelligence or communication capability (e.g. LEDs or the like, or lamp ("regular light bulbs") of any suitable type). Alternatively, a fixture or luminaire may be relatively dumb but include a source device (e.g. a "light bulb") that incorporates the intelligence and communication capabilities discussed herein. In most examples, the lighting device(s) illuminate a service area to a level useful for a human in or passing through the space, e.g. regular illumination of a room or corridor in a building or of an outdoor space such as a street, sidewalk, parking lot or performance venue. However, it is also possible that one or more lighting devices in or on a particular premises 12 served by a system 10 have other lighting purposes, such as signage for an entrance or to indicate an exit. Of course, the lighting devices may be configured for still other purposes, e.g. to benefit human or non-human organisms or to repel or even impair certain organisms or individuals. The actual source in each lighting device may be any type of light emitting unit.

In the examples, the intelligence and communications interface(s) and in some cases the sensors are shown as integrated with the other elements of the lighting device or attached to the fixture or other element that incorporates the light source. However, for some installations, the light source may be attached in such a way that there is some separation between the fixture or other element that incorporates the electronic components that provide the intelligence and communication capabilities and/or any associated sensor. For example, the communication component(s) and possibly the processor and memory (the 'brain') may be elements of a separate device or component coupled and/or collocated with the light source.

The example of system 10 utilizes intelligent lighting devices 11. Hence, each lighting device 11A or 11B has a light source 18A or 18B, a processor 21A or 21B, a memory 23A or 23B and a communication interface system 24A or 24B. One or more lighting devices 11A may include a sensor 15A.

Each communication interface system 24A or 24B includes a communication interface 25A or 25B configured to enable communication via a link to the network 17 of the lighting system. As noted, system elements within a room or other service area are coupled via suitable links for network data communications to form physical sub-network portions, and further communication links couple those physical sub-networks together into a premises wide data communication network 17. The local service area sub-networks may be relatively distinct from each other and distinct from but coupled to a wider area network but still within the premises 12, or the sub-networks and premises wide media may be relatively unified to form an overall data communication network as illustrated collectively at 17. Various network media and protocols may be used for the data communications. Although not separately shown, many installations of the network 17 will include one or more routers, and at least one router or other data communication device will serve as a gateway and/or firewall for communications off-premises with a wide area network (WAN) 61, such as an intranet or the public Internet. However implemented, the network 17 allows intelligent lighting system elements within respective service areas to communicate with each other and/or allows the elements within each of the service areas to communicate with elements in other service areas.

The communication interface 25A or 25B will correspond to the physical, electrical and signaling protocol requirements of the particular technology adopted for the data network 17 in the particular premises 12 or area of the premises 12. For example, if the network is a wired Ethernet network, each interface 25A or 25B will include an appropriate Ethernet cable connector as well as an Ethernet card to enable the lighting device 11A or 11B to communicate data in electrical Ethernet signals and data protocols over the respective wired Ethernet link.

Some of the lighting devices 11B also support wireless communication with other devices (i.e. non-lighting-system devices) 19 at the premises 12, althgouh as discussed more below, one or more of the lighting controllers 13 and/or lighting related sensors 15 also may include wireless data communication capabilities.

Hence, in the example, each of the lighting devices 11B has a communication interface system 24B configured both for data communications through the network 17 and for wireless data communications with other devices 19. The communication interface system 24B may be a single interface configured for both types of communication or may utilize multiple interfaces configured for the different types of communication. In the example, the system 24 B includes a first communication interface 25B for data communication via the network 17 of the system 10, as discussed above. The communication interface system 24B also includes a wireless communication interface 26B.

Although the interfaces 26B may utilize readily available standardized wireless communication technologies, the wireless interfaces 26B as well as compatible interfaces in devices 19 within the premises 12 will typically operate at relatively low power. The wireless communication interfaces 26B may utilize any suitable available wireless technology, for example, WiFi or Bluetooth or Zigbee or pico or femto cell mobile wireless, etc. For discussion purposes, we will assume use of a standardized wireless communication technology, like one of the enumerated examples. Although the radio frequency or other electromagnetic signal communications over the air will conform to the applicable standard, the power level(s) used in the examples is/are set well below the maximum level(s) permitted under the applicable standard. As a result, the wireless coverage range provided by such otherwise standard compliant wireless data transceivers in the interfaces 26B will typically be shorter than normally achieved using standard compliant wireless equipment. Power level of wireless operation of the wireless communication interface 26B and/or its effective range may be 15% or less, say 5-10%, of a normal level for a hotspot or wireless access point or the like operating under the particular standard. If WiFi is used, as one example, if a typical WiFi wireless access point for a hotspot or the like might operate at a power level offering a typical wireless data communication range of 100-150 feet, WiFi transceivers used in the interfaces 26B might operate at approximately 10% of the normal operating power level so as to offer wireless data communication over a range of approximately 10-15 feet.

Next we will discuss the UI device/lighting controller 13.

The UI devices 13 serving as the lighting controllers in this example also are implemented as smart/intelligent devices of the lighting system, with processing and communication capabilities. Hence, each UI device/lighting controller 13 includes a processor 31, a memory 33 and a communication interface system 34, as well as one or more input and/or output elements 37 for physical user interaction as represented generally by user I/O element 37 in the drawing. The element 37, for example, may include a toggle switch, a rotary controller, one or more sliders, a keypad and/or a touchscreen display. A touchscreen display, for example, may support touch and touch gesture input as well as visual display output. Other examples of the UI input may include a video input and associated processing for gestural control detection, a microphone, an occupancy/motion sensor, proximity sensor, etc. If provided, outputs may be visual, audible, tactile, etc. For example, a microphone and/or speaker may be used to support audible input and/or output, whereas a camera in combination with projector or display may be used to support visual input and/or output.

Although shown as a relatively integral arrangement, the communication interface system and possibly the processor and memory (the 'brain') may be elements of a separate device or component coupled and/or collocated with the user I/O element 37, e.g. in a separate module connected to the user I/O element 37.

Like the lighting devices 11, the UI devices 13 are connected to the network 17 of the lighting system 10 for data communications, with other system elements in or near the respective services areas within the premises 12 and possibly for communications with other elements or device at or outside the premises. Hence, the communication interface system 34 in each UI device/lighting controller 13 includes a communication interface 35 configured to enable communication via a link to the network 17 of the lighting system (analogous to the interfaces 25A and 25B in the lighting devices 11A and 11B). Although not shown, it may be advantageous in providing desired wireless coverage in some rooms or other types of service areas for some (one or more) of the UI devices/lighting controllers 13 to have wireless communication interfaces system 34 that include wireless communication interfaces similar to the interfaces 26B.

Next we will discuss the various examples of sensors.

As outlined earlier, in the example of FIG. 1, any sensors included in the system 10 also have or are associated with intelligence and communication capabilities. The sensor 15A is integrated into a lighting device 11A; and the processor, memory and communication interface of that device provide the intelligence and communication capabilities associated with that sensor 15A. The sensor 15, however, is a standalone device and includes its own individual intelligence and communication capabilities.

The sensor 15 includes a physical condition detector (D) 41, which is the actual device that is responsive to the particular condition to be sensed. The detector 41 may receive a drive signal; and in response to the sensed condition, the detector 41 produces a signal having a characteristic (e.g. voltage magnitude) that is directly related to a characteristic level of the sensed condition. The sensor 15 also includes a detector interface circuit (Int.) 43. The circuit 43 provides any drive signal that may be needed by the particular device type of physical condition detector 41. The detector interface circuit 43 also processes the output signal or signals from the detector 41 to produce a corresponding output, in a standardized data format, for use by the associated intelligence. The integrated sensor 15A in lighting device 11A may be implemented by a detector and interface circuit analogous to the physical condition detector 41 and the detector interface circuit 43.

The standalone implementation of a sensor 15 also includes a processor 45 and an associated memory 47. The sensor 15 also includes a communication interface system 48. Although shown as a relatively integral arrangement, the communication interface system 48 and possibly the processor 45 and the memory 47 (the 'brain') may be elements of a separate device or component coupled and/or collocated with the detector 41 and/or the detector interface circuit 43, e.g. in a separate module connected to the interface circuit 43 or with the interface circuitry 43 in a separate module connected to the detector 41.

Like the lighting devices 11 and the UI devices 13, the standalone sensors 15 are connected to the network 17 of the lighting system 10 for data communications, with other system elements in or near the respective services areas within the premises 12 and possibly for communications with other elements or device at or outside the premises. Hence, the communication interface system 48 in each sensor 15 includes a communication interface 49 configured to enable communication via a link to the network 17 of the lighting system (analogous to the interfaces 25A and 25B in the lighting devices 11A and 11B). Although not shown, it may be advantageous in providing desired wireless coverage in some rooms or other types of service areas for some (one or more) of the sensors 15 to have wireless communication interfaces system 48 that include wireless communication interfaces similar to the interfaces 26B.

The examples show one communication interface in each intelligent lighting system element 11, 13 and 15 for communication with the on-premises data network 17 and, if provided, one wireless communication interface for supporting wireless data communications of other devices 19 in proximity. Although not shown for convenience, there may be multiple communication interfaces for data communication over multiple media in any one system element (e.g. local area network over wired or optical Ethernet or DMX etc. for on-premises network communications and, where included, wireless interfaces for one or more of pico or femto cell, WiFi, Bluetooth or Zigbee, etc.). In many installations, for convenience, cost, maintenance reasons or the like, for example, the wireless communication interfaces provided in various intelligent lighting system elements will support only one type of wireless communication. However, where deemed cost effective (e.g. in some enterprise installations) it may be desirable for at least some elements to support two or more of the different types of wireless communications with other devices 19.

Even in one room, different elements may provide wireless coverage for different zones within the room. For example, a low power coverage via a wireless communication interface in a first lighting device may cover a small area of the room, a low power coverage via a wireless communication interface in a another lighting device may cover a small area of the room adjacent the coverage by the first fixture, and so on, so as to provide coverage areas much like small cells around each of the lighting devices (that have the wireless capability) and thereby cover a substantial portion or all of the area of the particular room. The size and/or shape of adjacent coverage areas may or may not be similar. Other service areas in the premises may be covered for wireless communication in a similar manner.

As the intelligent lighting system elements provide smaller and smaller coverage zones or cells (based on lower wireless power settings), each element with a wireless transceiver type interface still can provide wireless communication to serve some number of other devices 19 within range. As a corollary, the other devices 19 can operate at lower power levels, for example, to reduce interference while large numbers operate within the area or the premises 12 and/or to allow the other devices to incorporate more cost effective wireless transceivers.

The system 10, for example, may provide one, two or more intelligent lighting system elements 11,13 and/or 15 in each service area of the premises 12 that are configured to provide the relatively short range, low power wireless data communication links for use by other non-lighting-system devices 19. For example, it is envisioned that many if not all of the lighting devices 11, particularly those implemented as installed light fixtures, may have interface systems 24B configured to support the low power wireless data communication for other devices 19. Some or all of any moveable lighting devices that are operated at the premises 12, e.g. table or floor lamps or the like, may also have interface systems 24B configured to support the low power wireless data communication for other devices 19. Alternatively, a moveable lighting device may be configured to use the wireless link to communicate with another system element and through that element with the network 17.

Fixed or moveable user interface devices 13 or sensors 15 may or may not be configured to support wireless data communication access for other devices 19. For example, a fixed installation of a user interface device 13 or sensor 15 may have a communication interface similar to 24B to provide a link to the network 17 for wireless communication access by other devices. A moveable device 13 or 15 could be similarly configured, however, it may be preferable to configure such a moveable device 13 or 15 with a wireless interface more like 55 that accesses the system network 17 via a light fixture or the like using a wireless link.

As the density of wireless communication capable system elements 11,13 and/or 15 in the premises 12 or an area thereof increase, the power levels of the wireless communication interfaces 26B can be set lower to avoid undue interference. However, the numerous smaller areas of wireless coverage provided by such wireless capable elements may still provide ample wireless coverage for useful numbers of other devices 19 within an area or within the premises as a whole.

Some of the intelligent system elements, e.g. lighting devices 11, UI devices 13 or sensors 15, may have or be enhanced with audio or video input or output equipment. A sensor, for example, may include a camera and/or a microphone as the detector(s). A UI device 13 may include a display for output and may include a camera for user input, alone or in combination with other user input elements. For example, a UI device arrangement might utilize a touch-screen alone or in combination with a camera. Alternatively, a UI device may utilize a microphone for audio input alone or in combination with a speaker for audio output to the user. Audio and/or video sensing as well as audio and/or video output capabilities also may be incorporated into enchanted lighting devices. Such a lighting device 11, for example, might have or connect to a speaker and a projector to provide audio-visual information output. A microphone and/or camera in an enhanced lighting device might provide area monitoring and/or additional form(s) of user input to the system for lighting or other purposes.

Although not shown, each of the system elements that uses power to operate as described may include a power supply circuit and will connect to or possibly contain a power source. The lighting devices 11A and 11B may draw power from an AC grid or from a DC grid. The lighting devices 11A and 11B, for example, may draw power from alternating current (AC) mains in the building or other type of premises where the system 10 may be installed. In an AC grid type example, the power supply circuit of a particular lighting device 11A or 11B will include a light source driver circuit to process power drawn from the AC mains in any manner as may be appropriate to drive the particular type of light source incorporated in the particular lighting device. The source driver may be a simple switch controlled by the processor, for example, if the source is an incandescent bulb or the like that can be driven directly from the AC current. As another example, the drive circuit may convert AC power to one or more appropriate DC voltage and/or current levels to provide power to DC driven light source(s) such as light emitting diodes (LEDs). The power supply would also process AC power from the mains to provide voltage and/or current levels to power the elements (e.g. processor, memory and interface) serving as the device intelligence and for the communication interface.

In the example, the power supply circuit for each lighting device receives electricity from AC mains, however, one or more of the lighting devices for each service area may be driven by a battery or other power source for a particular application. For example, one or more lighting devices in each room and one or more lighting devices in a corridor each may have or connect to a back-up battery or other back-up power source to supply power for some period of time in the event of an interruption of power from the AC mains.

Other system elements in each service area, such as lighting controllers or other user interface devices 13 and/or any standalone sensors 15 would likewise include appropriate power supply circuits, which may rely on AC or DC power from the mains, battery power and/or ambient power harvesting, etc., as needed to operate the components of each respective system element. Examples of ambient power harvesting include vibration responsive power generation, photovoltaics, mechanical work (e.g. EnOcean), etc.

As shown by the description of the system 10 above, the system 10 provides lighting services in areas of the premises 10 and provides wireless communications for other devices 19 at the premises. Essentially, the system 10 with its wireless communication capabilities and its data network 17 becomes the backbone or hub for data communications for the other devices 19 within the premises.

In this way, the intelligent lighting system elements provide data network access for other non-lighting-system devices 19 in the premises 12, typically, via wireless links. The lighting system/network 10 enables such devices 19 to communicate with other devices 19 within the premises as well as devices/systems outside the premises 12. Data from devices 19 in the premises 12 becomes available to affiliated equipment/entities outside the premises, and/or such equipment/entities outside the premises may be allowed access to control the other devices 19 within the premises 12. In many cases, the wireless capable intelligent lighting system elements and the network 17 largely serve as a conduit for data communications of the other devices 19 with off-premises equipment/entities. However, in at least some instances, one or more of the intelligent lighting system elements may communicate with and interact with one or more of the other devices 19, for example, to enable initial set-up of other devices for communications via the system 10 or possibly to provide some services in support of operations of at least some types of other devices 19.

It may be helpful to discuss examples of the other devices 19 that may benefit for communications via/with the network-of-networks thus formed by the lighting system 10. By way of example, FIG. 1 also depicts a block diagram of the functional elements of another (non-lighting related) device 19 that may utilize the communication capabilities of the system 10 and become part of the network-of-networks, at the premises 12.

The other non-lighting-system devices 19 are non-system devices in that they are not commissioned or otherwise configured to operate as elements of the lighting system 10 for regular lighting related functions and/or lighting system related communications (e.g. not for communications with the outside equipment of a company servicing the lighting system itself). For example, such other devices typically are manufactured, sold and/or maintained by one or more parties different from those involved in the manufacture, sale, installation, and service or other maintenance of the elements and network forming the system 10. Many of the other devices 19 are non-lighting devices in that the principal functions thereof are for purposes other than lighting at the premises 12. Some of the non-system devices 19, however, may be lighting devices that operate in some manner more independent of the lighting functions of the system 10 than the lighting devices 11, e.g. a table or floor lamp that is not configured as an integral element of the system 10 typically provided from a different vendor that the elements of the system 10. As another example, some of the non-system devices 19 may have some ancillary lighting emission or sensing function (e.g. to provide light on the exterior of a refrigerator upon sensing that a user has operated the ice maker or a control panel on the exterior and/or to provide light inside the refrigerator upon sensing that a user has opened the door).

The other devices 19 that will utilize communication via the system 10 are intelligent devices in that each device 19 includes a processor 51 and a memory 53. The 'brain' of such a device will be coupled to and control appropriate device electronics 59. The electronics and the programming run by the processor 51 to control operation of each particular device 19 will depend on the particular type of device product.

The devices 19 may be virtually any type of device, typically not directly related to lighting system operation, which may utilize data communications, in this case, via the elements and network of the system 10. By way of just a few examples, the other devices may be components of a heating, ventilation and air conditioning (HVAC) system, any of various appliances found in modern homes or businesses, water controls (e.g. electrically controlled valves or faucets), other sensors, audio or video gear, etc. The device electronics and programming of each such device 19 thus will correspond to the different type of device.

Although a device 19 may have other means of communication (not shown), each of the other devices 19 that will communicate with or through the system 10 also includes at least one wireless (W) communication interface 55 that is compatible with the wireless communication capability offered by the particular installation of the lighting system at the premises 12. Like the interfaces 26B discussed earlier, the wireless (W) communication interface 55 may utilize readily available standardized wireless communication technologies, and the wireless communication interfaces 55 within the premises 12 will typically operate at relatively low power. The wireless communication interfaces 55 may utilize any suitable available wireless technology, for example, WiFi or Bluetooth or Zigbee or femto or pico cell mobile wireless, etc. For discussion purposes, we again assume use of a standardized wireless communication technology, like one of the enumerated examples.

Although the radio frequency or other electromagnetic signal communications over the air will conform to the applicable standard, the power level(s) used in the examples is/are set well below the maximum level(s) permitted under the applicable standard. As a result, the typical ranges over which the transceivers of interfaces 55 may be able to communicate will typically be shorter than normally achieved using otherwise standard compliant wireless terminal device equipment. As a complement to operation of the wireless interface 26B, power level of wireless operation of the wireless communication interface 55 in each of the devices 19 and/or its effective range may be 15% or less, say 5-10%, of a normal for a wireless device (e.g. wireless adapter or the like) operating under the particular standard. If WiFi is used, as one example, if a typical WiFi wireless adapter or the like might operate at power levels offering a typical wireless data communication range of 100-150 feet, WiFi transceivers used in the interfaces 55 might operate at approximately 10% of the normal operating power level so as to offer wireless data communication over a range of approximately 10-15 feet.

Continuing with the WiFi type implementation, as one example, the wireless communication interface 55 may take the form of an air interface card or the like configured to operate as a WiFi adapter. However, the actual transmitter and receiver included in the interface card would at least be set-up to operate at low power corresponding to the low power communications of the matching interfaces in the lighting system elements. In many cases, the manufacturers of the other devices 19 may design their devices to include only low power implementations of the transmitter and receiver, e.g. as a cost saving measure and/or to conserve power required to operate respective types of devices 19.

A device 19 may include one or more input and/or output (I/O) elements 57 for a user interface. The user I/O element 57, for example, may include a toggle switch, a rotary controller, one or more sliders, a keypad and/or a touchscreen display. The precise user I/O element, if provided, depends on the operational characteristics of the particular other device 19. For example, for an HVAC controller, the user I/O element(s) 57 might be similar to those of a digital thermostat. A touchscreen display, as another example, may support touch and touch gesture input as well as visual display output. A faucet might have simple manual controls to turn ON/Off and adjust the flow of water. A hair dryer might have an ON/OFF switch and heat and/or airflow rate level-setting switch(es). Other examples of the UI input may include a video input and associated processing for gestural control detection, a microphone, an occupancy/motion sensor, proximity sensor, etc. If provided, outputs may be visual, audible, tactile, etc. For example, a microphone and/or speaker may be used to support audible input and/or output, whereas a camera in combination with projector or display may be used to support visual input and/or output.

As outlined above, each of the lighting system elements 11, 13, 15 includes a communication interface system 24A, 24B, 34, 48; and each such interface system includes a data communication interface 25A, 25B, 35, 49 configured to enable communication via a link to the network 17 of the lighting system 10 at the premises 12. A number of the lighting system elements 11, 13 or 15 also support wireless communications for other devices 19 at the premises 12, enabling such other devices access to the data network 17. The other devices 19 in turn include wireless communication interfaces 55 corresponding to the wireless communication interfaces in the wireless capable intelligent lighting system elements.

The communication network 17 allows system elements 11, 13, 15 within the premises 12 to communicate with each other and communicate via the wide area network WAN 61, so as to communicate with other devices generally represented by way of example by the server/host computer 63 and the user terminal device 65. The network 17 and the wireless communication access to the network 17 provided by the system 10 also allows other devices 19 to communicate via the wide area network (WAN) 61, so as to communicate with outside devices such as the server/host computer 63 and the user terminal device 65 (although the outside devices may be different from those witch which the lighting system elements 11, 13, 15 typically communicate).

A host computer or server like 63 can be any suitable network-connected computer, tablet, mobile device or the like programmed to implement desired network-side functionalities. Such a device may have any appropriate data communication interface to link to the WAN 61. Alternatively or in addition, a host computer or server similar to 63 may be operated at the premises 12 and utilize the same networking media that implements data network 17.

The user terminal equipment such as that shown at 65 may be implemented with any suitable processing device that can communicate and offer a suitable user interface. The terminal 65, for example, is shown as a desktop computer with a wired link into the WAN 61. However, other terminal types, such as laptop or notebook computers, tablet computers, ultrabook computers, netbook computers, and smartphones, may serve as the user terminal computers. Also, although shown as communicating via a wired link from the WAN 61, such a device may also or alternatively use wireless or optical media; and such a device may be operated at the premises 12 and utilize the same networking media that implements data network 17.

For various reasons, the communications capabilities provided at the premises 12 may also support communications of the lighting system elements with user terminal devices and/or computers within the premises. The user terminal devices and/or computers within the premises may use communications interfaces and communications protocols of any type(s) compatible with the on-premises networking technology of the system 10. Such communication with a user terminal, for example, may allow a person in one part of the premises 12 to communicate with a system element 11, 13, 15 in another area of the premises 12, to obtain data therefrom and/or to control lighting or other system operations in the other area.

The external elements, represented generally by the server/host computer 63 and the user terminal device 65, which may communicate with the system elements at the premises, may be used by various entities and/or for various purposes in relation to operation of the lighting system 10. Alternatively or in addition, the external elements, represented generally by the server/host computer 63 and the user terminal device 65, which may communicate with one or more of the other devices 19 at the premises, may be used by various entities and/or for various purposes appropriate to the various different types of other devices 19 that may be located and operating at the particular premises 12.

As shown by the discussion of FIG. 1, more and more elements in the home, office or factory have some processing capability, and some communication capability. In the specifically illustrated example of system 10, such devices 19 communicate over wireless links to lighting devices 11A (and possibly others of the intelligent lighting system elements); and via the wireless capable lighting devices 11A, the other devices 19 communicate via the network 17 that services the lighting system elements with external network 61 and with other devices/systems 63, 65 outside the premises. The lighting device 11A (or other wireless capable element of system 10) becomes the portal or communication port for other non-lighting-system devices 19 with appropriate communication capability. Various lighting equipment and other 'things' within the home become parts of the network implemented by the lighting system 10, to access information from the devices in the home and/or to control such devices. Other devices 19 in the home may become user interfaces for lighting or HVAC control purposes. For example, a refrigerator with a touchscreen may support use of the touchscreen to control light, HVAC and other appliance at any location within the premises using communications of the refrigerator via the lighting network.

In some installations, either in a room or throughout a premises 12, all of the lighting devices will include a communication interface that supports the low-power wireless communications for other devices 19. However, it is also envisioned that in some installations, some lighting devices 11B will include a communication interface that supports the low-power wireless communications for other devices 19, which other lighting devices 11A will not. As noted, it may also be desirable in some locations or premise to include a wireless communication interface in one or more of the UI devices/controllers 13 and/or in one or more of the standalone sensors. 15. Furthermore, in any intelligent lighting system element 11, 13 or 15 that does support wireless communication, there may be one interface for one type or standard of wireless communication, or there may be one or more wireless communication interfaces configured to support two or more types/standards. For example, one element may support wireless communication in two or more distinct/noninterfering frequency bands. As another example, one element may support WiFi and either or both of Bluetooth and Zigbee.

Figure 2:
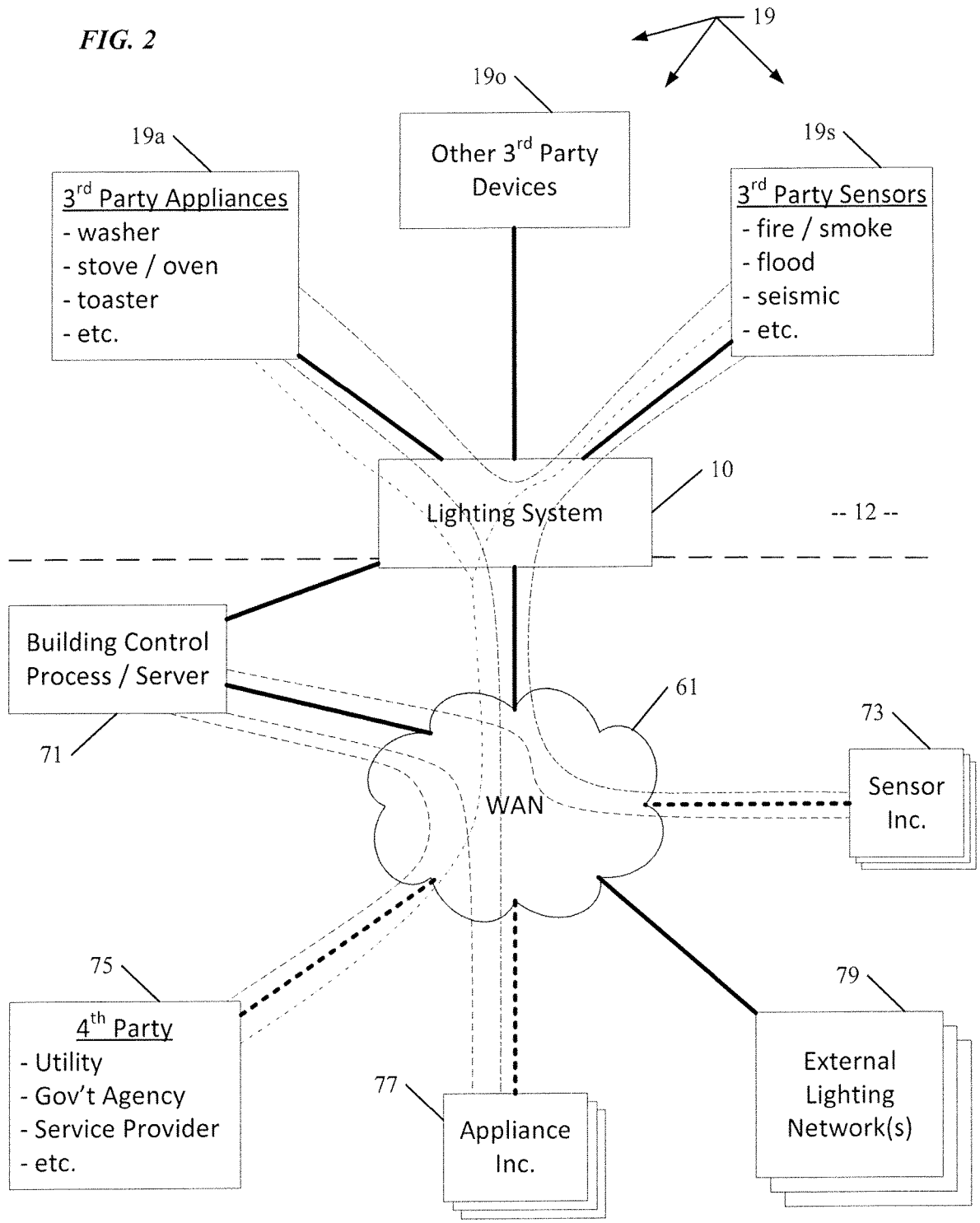
FIG. 2 is an alternate block diagram of such a system, with a higher level illustration of the system and other devices at the premises but useful in understanding examples of various systems/entities that may be involved in communication with lighting system elements and other devices at the premises.

FIG. 2 is an alternate diagram of the system 10, with a higher level illustration of the system 10 and other devices 19 at the premises 12 but also showing logical organizations and examples of various systems/entities outside the premises 12 that may be involved in communication with lighting system elements and other devices 19 at the premises 12. It should be noted also that, although FIG. 1 depicted a system 10 of a single premises, in practice there may be similar systems installed any number of premises at diverse locations, as will be discussed further as part of the description relative to FIG. 2.

For discussion purposes, some of the drawings and some of this description refer to third ($3^{rd}$) and fourth ($4^{th}$) parties. This nomenclature distinguishes other parties from the party or parties that install and maintain the lighting system as well as the party or parties owning, operating or occupying the premises 12. In FIG. 2, examples of third parties would be various enterprises that manufacturer install or maintain appliances, sensors and other devices at the premises. As will be discussed, these parties may also operate various external equipment that communicates with their devices at the premises 12, for example to receive sensor data, to monitor operations for their devices 19, to provide maintenance services relative to their devices 19, etc. Fourth parties are other entities (enterprises or individuals) who may have at least some more indirect interest in the premises 12 or the system 10 or the other devices 19 installed at the premises. For example, some such fourth parties may have an interest in sensor or equipment monitoring data from any number of premises like 12, or these other entities or parties may have some interest in occasional control of equipment at various different premises 12.

For convenience, FIG. 2 shows two specific categories of other devices 19. One category of other devices 19a represents appliances sold and/or installed by third parties. Examples of third-party appliances 19a that might be installed at a residential type premises 12 include a washer, a stove or oven, a toaster, etc. The appliances 19a are referred to as third party appliances here because many such appliances may be offered for sale and serviced or maintained by one or more parties other than the enterprise(s) that sell and service the lighting devices and other lighting system elements.

The other category example 19s represents third-party sensors. In the example of FIG. 2, the owner or operator or the like of premises 12 has also installed one or more sensors 19s for sensing conditions that the lighting system 10 in the example need not necessarily use in its regular lighting-related operations. Examples of third-party sensors 19s that might be installed at a residential type premises 12 include a fire, smoke or CO2 sensor, a flood sensor, a vibration sensor for seismic detection or the like, etc. The sensors 19s are referred to as third party sensors here because many such sensors may be offered for sale and serviced or maintained by one or more parties other than the enterprise(s) that sell and service the lighting devices and other lighting system elements.

Sensors and appliances represent just two classes or categories of other devices 19 or equipment at a premises 12 that may communicate via the lighting network 17 and/or interact with the intelligent elements of the lighting system at the premises. Obviously, there may be any number of other types of other devices or equipment at a premises 12 that may communicate via the lighting network 17 as shown collectively at 19o. Again, the devices 190 are referred to as third party devices here because they typically will be offered for sale and serviced or maintained by one or more parties other than the enterprise(s) that sell and service the lighting devices and other lighting system elements.

FIG. 2 also generally shows the lighting system 10. In this context, the system 10 includes all of the intelligent lighting system elements 11, 13, 15 and the data network 17 discussed above relative to FIG. 1. Also, the other devices 19a, 190 and 19s communicate with and through the lighting system 10, as outlined above relative to FIG. 1. FIG. 2 also shows the WAN 61 and the connection thereof to the lighting system 10. This arrangement allows the lighting system elements 11, 13, 15 and the other devices 19 to communicate with any of a wide range of other systems or terminal devices outside of the particular premises 12. As will be discussed more later, this allows the lighting system 10 to communicate with other lighting networks or systems as shown at 79 in FIG. 2.

The intelligent lighting system elements, such as elements 11, 13, 15 in FIG. 1 may communicate with equipment outside the premises for a variety of purposes. For example, such elements may communicate with server equipment or user terminal equipment, to allow the owner or occupants of the premises to remotely monitor and/or control lighting in the premises 12. As another example, the intelligent lighting system elements may communicate with server equipment or user terminal equipment of the vendor(s) of those elements or another enterprise having a contract for service or maintenance of the lighting system at the premises 12.

As noted in the discussion of FIG. 1 above, the wireless interfaces 26B (and any similar interfaces if provided in UI devices 13 or in sensors 15) as well as compatible interfaces in devices 19 within the premises 12 will typically operate at relatively low power. However, because there are sufficient wireless access nodes provided by the lighting system elements throughout at least some areas of the premises, there is sufficient coverage throughout a substantial portion and possibly all of the premises 12 to allow other devices 19 in the various areas of the premises to communicate through the those lighting system elements and the backbone data network 17 of the lighting system. Processors in those elements of the system 10 that support such wireless communications are configured to control communications of other devices 19 to provide access to the data network 17 and through the data network 17 to the WAN 61 outside the premises for non-lighting related communications of the other devices. Hence, in addition to communications of outside entities with the lighting system elements at the premises 12, the lighting system 10 supports similar communications for various other entities having a need or desire to communicate with third party equipment 19a, 190 or 19s at the premises 12. More specifically in our example, the illustrated arrangement of FIG. 2 also allows the other devices 19 and in some cases the lighting system elements 11, 13, 15 to communicate with equipment of a variety of other third ($3^{rd}$) and fourth ($4^{th}$) parties.

For example, the lighting system elements 11, 13, 15 as well as at least some of the other devices 19 may communicate with a building control or process server shown at 71 in FIG. 2. Such a building control server 71 may operate as a service bureau to provide overall building control for many of the automated systems and devices at premises 12 (and possibly at other customers' similar equipped premises). The communications here between the building control server 71 and the lighting system elements, for example, allow the server 71 to monitor and in some cases control operations of lighting devices 11 within the premises 12. The server 71 may also be able to obtain data from some or all of the lighting-related sensors 15A. In a similar fashion, the server 71 may also be able to obtain data from some or all of the third-party sensors 19s, for example with respect to operation of heating, ventilation and air conditioning (HVAC) equipment at the premises 12. In turn, such a building control server 71 may be able to communicate with and control the HVAC equipment at the premises 12 and/or some appliances 19a at the premises 12.

The building control process/server 71 in the illustrated example is outside the premises; although the server 71 may be operated logically or physically form within the premises 12, depending on the entities operating the server and/or those using the functionalities supported by the server. For example, one enterprise might offer building control as a contracted service bureau type service using external servers 71, as outlined above. Conversely, a home owner or an enterprise operating at the premises 12 may instead prefer its own internal building control in which case the server may be on the premises 12 either on a standalone platform or implemented as a distributed processing function on two or more of the intelligent lighting system elements 11, 13, 15 at the particular premises 12.

Although referred to as third or fourth party communication, the external communication access offered by the system 10 and the WAN 61 may also allow a user in the home or in an enterprise type of premises 12 to interact with and/or control devices in the home, e.g. to run an app on a cell phone to monitor and control lighting and/or other devices in the premises from within the premises or remotely (either directly or via an intermediate server such as the server 71.

The example of FIG. 2 also includes outside equipment of one or more sensor companies as shown at 73. The equipment 73 of a sensor company may take the form of a server alone or in combination with one or more user terminal device(s) for personnel of that enterprise. As noted earlier, any number of sensors 19s may be installed and/or monitored by third parties. For example, a security monitoring company might operate equipment 73 to monitor fire, smoke, gas (e.g. CO2 or natural gas leakage) and unauthorized entry sensors at the premises, using the network 61 and the data communication functions offered by the lighting system 10. Various communication models (e.g. polling type 'pull' data communication, periodic reporting or event responsive reporting) may be used to allow the equipment 73 to collect data from any or all of the sensor(s) 19s monitored by the particular sensor enterprise. The equipment 73 may make the sensor data available to personnel of that enterprise for various enterprise purposes. Alternatively or in addition, the equipment 73 may trigger responsive action, e.g. dispatch personnel to respond to an undesired condition or initiate a report to public emergency response personnel.

The example of FIG. 2 also includes outside equipment of one or more appliance companies as shown at 77. The equipment 77 of an appliance company may take the form of a server alone or in combination with one or more user terminal device(s) for personnel of that enterprise. When a $3^{rd}$ party device 19a comes on line, for example, the device can auto-register with the manufacturer or service company. Such devices can report operations to the company equipment 77, e.g. for company use for maintenance or service purposes. However, data from the other devices 19a is also available to the relevant enterprises for other purposes, e.g. to allow the manufacturer to learn what features of and/or exactly how its products are used by its customers for use in designing upgrades and/or new more advanced products.

As noted earlier, any number of appliances 19a may be installed and/or monitored by third parties. For example, a washer and dryer by a particular manufacturer may be monitored for warranty and service purposes by the manufacturer or another entity under contract to the manufacturer or the premises occupant (e.g. as arranged through an intermediate vendor). A stove/oven, a toaster, etc. by other manufacturers may be monitored for similar purposes by the same or other enterprises. Again, various communication models (e.g. polling type 'pull' data communication, periodic reporting or event responsive reporting) may be used to allow the equipment 77 to collect data from any or all of the appliances 19a monitored by the particular appliance enterprise. The equipment 77 may make the appliance data available to personnel of that enterprise for various enterprise purposes, e.g. to provide data that can be analyzed as an indication of customer usage of each monitored appliance and/or as an indication of operational condition thereof over time and/or over extended usage. Alternatively or in addition, the equipment 73 may trigger responsive action, e.g. dispatch personnel to service an appliance that has failed in some manner or is predicted to fail in the near future. The equipment 77 of the appliance company may also be able to send messages to the relevant appliances 19a for various purposes, for example, to update data or program instructions in an appliance as a form of service repair or upgrade, or to control an operation of the appliance (e.g. to shut off an appliance that may be malfunctioning in some way).

The example of FIG. 2 also includes outside equipment of one or more other ($4^{th}$) parties, as shown at 75. Depending on the entity and the relationship(s) with the various parties involved at or with monitoring/servicing the lighting system 10 and the other devices 19, the equipment may communicate with the intelligent lighting system elements 11, 13, 15 and/or with applicants 19a, sensors 19s or other $3^{rd}$ party devices 19o. Again, various communication models may be used to collect information from various equipment at the premises 12.

A utility, such as an electric company supplying power to the premises, may use such equipment 75 and network communications to collect power usage data from the lighting system 10 and from other devices 19 at the premises 12, e.g. to provide a more granular view as to actual consumption at the premises 12 and any number of other similarly equipped premises. When appropriate, e.g. at a time of excessive demand in a geographic area encompassing the premises 12, the utility might control some elements or devices at the premises to reduce consumption. Of course, a utility may implement other forms of control, e.g. to shift some high-power consuming operations to off-peak times. The owner/occupant of the premises, in turn, may receive a lower power rate in exchange for agreeing to at least some such control by the utility. As another example of power company interaction, the lighting system elements and/or the other devices at the premise 12 may allow monitor signals on the power line report whether any equipment is causing transients that may reduce efficiency to equipment 75 of a power company, for corrective control or other maintenance purposes.

Some government agencies may also have an interest in collecting data from and/or controlling some of the other devices 19 and various premises like 12. For example, where a sensor company might collect vibration data for analysis of machinery operating at the premises 12, a government geological agency might collect vibration data from the same or others of the sensors 19s as a way to detect and analyze seismic activity. Seismic data from a number of premises in a major geographic region (e.g. a metropolitan area) might thereby provide insight into the breadth of an earthquake and the distribution pattern of various levels of quake intensity across the geographic region over the time period of a seismic event. In a similar fashion, a weather agency (or a separate contractor) might collect data from sensors of various types forming weather stations at a number of premises like 12 across a geographic region. In the event of an emergency, occupancy sensors might provide responsive government personnel with information about which rooms/buildings are occupied.

External lighting networks 79 are similar to networked system 10 albeit located at other premises, for example, as manufactured, installed and/or maintained by the entity or entities that manufactured, installed and/or maintain the system 10 at premises 12. The other networks/systems 79 may be at premises of the same entity that owns, operates or occupies the particular premises 12 or at premises of one or more other entities. External lighting networks 79 in the example, however, are also meant to encompass networks/ systems of the vendor or other lighting service/maintenance entity. In an example in which one or more external lighting networks 79 are system/networks similar to system 10 of FIG. 1 but at other premises, communication with such other similar networks 79 may be desirable to an enterprise that owns or operates at the other premises as well as the premises 12. However, the external lighting networks may be other networks installed or serviced by the same enterprise entity as the system at premises 12 but occupied by different entities. In either case, communications via the network 61 enable the on premises system 10 and such external networks to interact and cooperate in operational data sharing and service/maintenance functions. Server and/ or user terminal devices for technicians of an installation and/or service entity may be included in or communicate via one of the networks represented by the external network 79 in our example, although such server or terminal devices may utilize other communications networks for data access to the WAN 61.

These are but a few examples of how $3^{rd}$ or $4^{th}$ parties might collect and use data from premises that have an installation of a lighting system 10 and other devices 19 that communicate through that system and the WAN 61. As the variety of other devices 19 expands, deployment thereof becomes increasingly persuasive, and the variety of outside users communicating with such devices for multi-variant purposes also expands, the on-premises system elements and other devices together with the outside equipment form a veritable Internet-of-things albeit centered around the lighting system 10 and the elements of that system 10.

Figure 3:
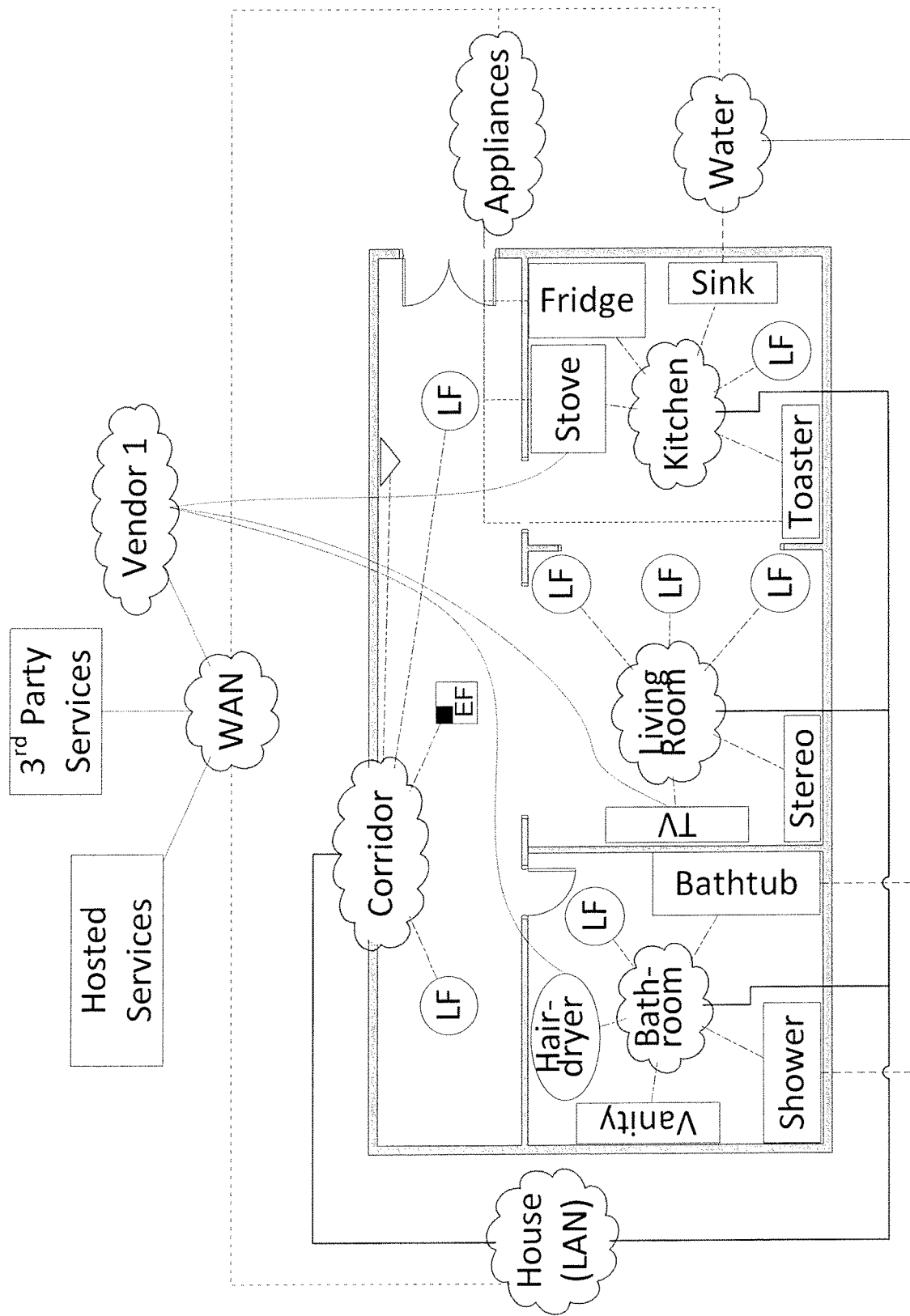
FIG. 3 is diagram including block illustrations for elements outside a premises and a layout of a simple example of a portion of a residential building with an overlay of system elements in that portion of the premises, useful in understanding various examples of network configurations that may be implemented in a system like that shown in FIG. 1 and/or FIG. 2.

FIG. 3 shows a simple layout of a residential building or a portion of such a building with a network system of lighting devices and related equipment installed therein, similar to the system 10 discussed above relative to FIGS. 1 and 2. For purposes of illustration and discussion here, the building includes three rooms along one long corridor. However, it should be readily apparent that the system under discussion here can be easily adapted to indoor installations with fewer or more rooms, more corridors, multiple floors, multiple buildings or to outdoor installations alone or in combination with in-building installations.

This layout drawing is intended to illustrate aspects of examples of the physical networking of lighting, communication and other elements of a system and other devices that communicate via that system, as may be deployed in a residence in this example. The layout diagram also illustrates some logical relationships for other devices on the premises, although different logical relationships will be discussed later, particularly with respect to FIG. 4.

The intelligent lighting devices used in a building installation like that of FIG. 3 may be any desirable type of luminaire (L). The term luminaire encompasses lighting fixtures as well as lamps that may not be installed in a fixed manner (e.g. floor or table lamps). In our example of FIG. 3, for convenience, the lighting devices take the form of lighting fixtures, and we will assume that all of the lighting fixtures support wireless communication for other devices in the vicinity similar to the lighting devices 11B discussed above relative to FIG. 1.

In the layout example, a number of the illustrated elements/devices are represented by block symbols with descriptive acronyms. For example, a rectangle with a shaded section in the upper right corner represents a lighting fixture with one or more enhanced capabilities, or "enhanced fixture" (EF). Examples of enhanced capabilities may include increased memory, faster processor, a user interface component (e.g. gestural control sensor, microphone/ speaker, video camera/projector, information display, etc.) and/or an integrated sensor for sensing a condition in relation to a lighting function or a condition for some other purpose not directly related to lighting or lighting control. Light fixtures without any such enhancement are represented in FIG. 3 by a circle LF.

The simple example of a residential premises includes a living room, a kitchen, a bathroom and a corridor. All of the intelligent lighting system elements in the rooms or corridors of the premises, coupled together into the lighting system and network, have at least some communication capability. For example, some number of such devices communicate with each other via local physical communication links. Some of the system elements may serve as a hub for communication with some or all of the other devices. In this way, the elements in each room or area together communicate via a sub-network in the room or area. The light fixtures (LF), user interface device(s) and/or standalone sensors (not shown) in the living room together form or connect to a living room network 17*l*. Similarly, the light fixtures (LF), user interface device(s) and/or standalone sensors (not shown) in the kitchen together form or connect to a kitchen network 17*k*; and the light fixtures (LF), user interface device(s) and/or standalone sensors (not shown) in the bathroom together form or connect to a living room network 17*b* for the bathroom. The enhanced fixture (EF), light fixtures (LF), user interface device(s) and/or standalone sensors (not shown) in the corridor similarly together form or connect to a living room network 17*b* for the corridor. A house network 17*h* may include additional links and/or network gear (e.g. router, gateway, firewall, or the like) to couple the sub-networks 17*b*, 17*c*, 17*k*, 17*l* together into one overall network for the premises similar to the network 17 discussed above relative to FIG. 1. For example, the communication media and interfaces in the various intelligent lighting system elements at the premises may together form a local area network (LAN), with portions thereof in the rooms and corridor. Any suitable LAN media may be used, such as power lines wiring, separate wiring such as coax or Ethernet cable, optical fiber or wireless (e.g. pico/femto cell, Zigbee, Bluetooth or WiFi). Some or all of the network communication media may be used by or made available for communications of other gear, equipment or systems within the premises. In particular, the wireless communication capability offered by the light fixtures EF and LF provide wireless data access to the networks 17*b*-17*l* at the premises for various types of other non-lighting-system devices. The network 17*h* also provides data communication access to the WAN 61.

By way of just a few examples of other devices utilizing the networking, as shown in FIG. 3, in the kitchen, appliances such as the stove, the refrigerator (Fridge) and the toaster utilize the wireless access to communicate via the kitchen network 17*k*. An electronically controlled faucet and/or any water flow or temperature sensors incorporated into or located at the sink may also utilize the wireless access to communicate via the kitchen network 17k. In a similar fashion, an electronically controlled faucet and/or any water flow or temperature sensors incorporated into or located at the vanity in the bathroom, as well as similar devices incorporated into or located at the bathtub and/or shower, may also utilize the wireless access to communicate via the bathroom network 17b. An appliance such as a hairdryer may incorporate a processor, memory and wireless communication interface to allow that device to utilize the wireless access to communicate via the bathroom network 17b. In the living room in our example, the television (TV) and one or more pieces of audio gear (identified generally as the Stereo) utilize the wireless access to communicate via the living room network 17l.

Briefly, in some rooms or the corridor in our example, one or more of the fixtures, luminaires, user interfaces, or standalone sensors in a particular lighting system service area may provide communications outside of the room or service area (to 17h in the drawing). Selection of the system element in an area that will provide the network connectivity into the LAN or the like may be based on selection criteria as part of a commissioning of the equipment in a particular service area. For example, if only one element in a room or the like has the actual connectivity, that element is chosen manually or chosen automatically by the other devices to provide the routing function. However, if two or more elements have the capability, one may be initially selected (for any appropriate reason), but then the other element takes over the routing function, for example, in the event that the first element may later fail, or be overloaded, busy, etc., or if the communication to/through the other element is better at a particular later time.

Alternatively, the system equipment in a particular room or other service area may include a gateway (Gw) hub (not shown for simplicity). Such a gateway hub in this later type of example is a device that provides communications capabilities and is not itself configured as a device of one of the other types. A gateway hub may support communications capabilities to and from some or all of the other devices within the room or other service area. In some examples, one of the other elements in the room or service area may support the communication outside the room or other service area. In other arrangements, the hub gateway provides the external network communications capabilities, although in some cases it does support the local intra device communications whereas in other examples the hub gateway does not support the local intra device communications. A gateway hub might also support other, non-lighting capabilities (e.g. memory, processing power, etc.).

The LAN/WAN combination of FIG. 3 provides communications capabilities inside and outside the premises in a manner analogous to the network 51 in the example of FIG. 1. Depending on the network media and protocol(s) used, the LAN may include a frame switch, a packet router or the like providing LAN interconnectivity. Although not shown, a gateway or the like may also be deployed on the LAN to provide various functions in support of interconnectivity of the LAN to/from the WAN.

The LAN functionality, however, may essentially be embedded in the room or area elements, except for the interconnecting media. For example, any of the system elements in each room or other service area may provide connectivity and switching/routing functions to interconnect the system elements via the applicable media to form a LAN on the premises 12. Also, one of the elements in a room or area may provide the interface to any external WAN. Hence, although shown separately for convenience, the elements that form the LAN may be integral with the lighting devices, etc. of the lighting system in the rooms or other types of areas serviced by the illustrated system. Alternatively, all intelligent system elements may connect directly to the WAN, in which case the house network is merely a premises wide logical relationship rather than a physical LAN. If the elements all connect through the WAN to a "cloud" service, the communication between elements could occur via exchange through the cloud server.

The WAN communication capability, particularly if the WAN is a relatively public network such as the Internet, may allow various parties to access the lighting network and the system elements that communicate via the network, as discussed above, for example, relative to FIG. 2.

The LAN as discussed here need not be a LAN of the type typically used today for computer or mobile device communications within a particular premises, although the lighting system may use or connect to such a network. For purposes of the present discussion, the LAN is a premises network for data communications among the lighting system elements and other devices within the premises and for data communications to/from the wide area network as discussed herein.

Separate from the physical networking configurations are various logical relationships among the system elements. For example, although generally similar in many respects, one of the elements in a room or other service area may be configured as a 'leader' unit whereas other system elements in the particular room or other service area may be configured as 'follower' units with respect to the designated leader. These relationships, however, are relatively dynamic and readily configurable. For example, programming of the elements in the system may provide automatic/autonomous discovery at installation; and in such an example, an initial set-up routine uses results of the discovery process to set-up logical relationships between elements and possibly other devices, for example, including selection of an intelligent system element as a leader unit. However, at a later time, if the leader unit is impaired or off-line, the network may be self-healing in that some or all of the set-up routine can be run again to select a replacement as a new leader unit from among the other devices that are operational on a particular part of the network. Alternatively, the system may have "fallback" plan in place, in which one or more other elements are pre-designated to take over the role of the leader in the event of failure or impairment of the initially selected leader. Effectively, such an arrangement may identify a first in command (leader), a second in command, etc.

In an example, the intelligent lighting system elements 11, 13 and 15 of the system 10 are configured to implement discovery and self-commissioning in a relatively automated manner, as disclosed in detail in the above incorporated U.S. application Ser. No. 13/903,330. Along with discovery and commissioning in relation to other intelligent lighting system elements of the system 10, the system elements 11, 13 and 15 may be configured to discover other devices 19 and incorporate element commissioning functions with regard to those discovered other devices. Conversely, other devices 19 may be configured to discover at least those of the intelligent lighting system elements 11, 13, 15 that support wireless communication and perform some related commissioning in a manner similar to the commissioning technique implemented amongst the system elements 11, 13 and 15. Alternatively, the commissioning technique implemented by the other devices 19 may utilize some but not all of the steps involved in the commissioning amongst the system elements 11, 13 and 15 for lighting and related operations.

In a premises like that of FIG. 3, the room networks 17b, 17k, 17l, and the corridor network 17c may also represent logical groupings or sub-networks as well as physical sub-networks. Such a location-related logical group may include the intelligent lighting system elements (lighting devices and any user interfaces and/or standalone sensors) as well other devices that use the wireless communications and data network of the system that are located in the particular service area (room or corridor in the example of FIG. 3). All elements and devices at a particular residential premises may also be part of a house-wide logical group. However, for other purposes, the system may support other logical groupings. Some logical grouping may be for lighting related purposes, although further discussion of the example of FIG. 3 will concentrate on logical groupings for other purposes. Logical groupings may be set up manually or automatically as part of an autonomous commissioning procedure.

As outlined above relative to FIG. 2, data processing equipment of a variety of entities outside the premises may access both the lighting system elements and the other devices at the premises via the WAN 61 and the system 10. In a similar manner, FIG. 3 shows equipment of an outside device vendor and generically shows equipment of hosted services and other third party services. Many communications of such outside equipment with system element and/or with other devices at the premises are supported or enhanced by logical groupings or logical sub-networks established at the premises. FIG. 3, for example, shows a logical sub-network for various appliances at the premises. In the example, the logically grouped 'appliances' includes the refrigerator, stove and toaster in the kitchen. Vendor 1 may also have an associated logical network of on-premises devices (and possibly devices at other premises) sold or serviced by that vendor. The logical network for vendor 1 includes the stove, television and hair dryer in our example. As another example, some or all of the various devices at the premises that use or provide water to or for the occupants of the residence are logically grouped together in a logical 'water' sub-network. These logical sub-networks of other devices at the premises communicate via the wireless network access offered in the illustrated example by the various light fixtures and the media of the physical room or corridor networks and the hose network, and through those on-premises network media and the WAN with outside equipment of the appropriate other parties.

Figure 4:
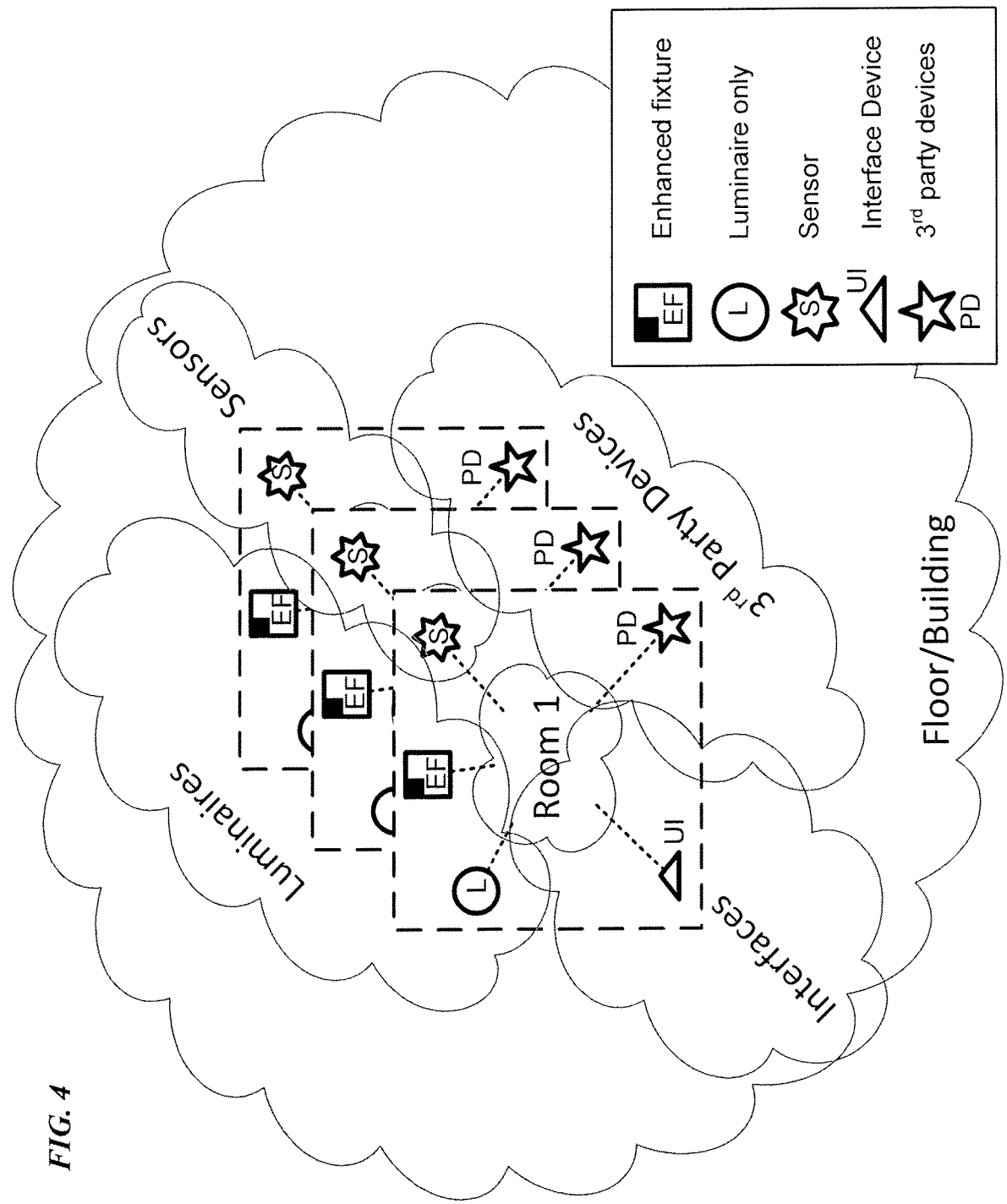
FIG. 4 is a diagram, for a simple example of a portion of a building or floor with an overlay of system elements, useful in understanding logical associations of system elements that may be implemented in a system like that shown in FIG. 1 and related client-server communications.

FIG. 4 provides an alternate depiction of a number of the system elements and other devices in a manner useful in explaining examples of several other logical arrangements that may be implemented in a system like that of FIGS. 1 and 2. For convenience, various system elements are represented in FIG. 4 by graphic symbols, as shown by the legend in the drawing. For example, a rectangle with a shaded section in the upper right corner again represents a lighting fixture with one or more enhanced capabilities, or "enhanced fixture" (EF). Luminaires are represented by circles (L). Luminaires in this example are lighting fixtures or lamps that perform normal lighting functions but do not have the added capabilities of the enhanced fixtures. Here, the luminaires (L) may include some lighting devices that do not support wireless communications. However, some enhanced fixtures (EF) and/or some other luminaires (L) do support wireless communications.

Sensors (S) are represented by seven-pointed stars. The sensors may be of types that sense conditions directly related to lighting, such as lighting device output, ambient light or occupancy sensors. However, as an alternative, any sensor represented by a seven-pointed star may be configured to detect some other type of condition that is not necessarily involved in lighting operations, such as sound, atmospheric conditions (e.g. temperature or humidity), vibration, etc. Other types of sensing for lighting control or other system functions include audio input, video input, electrical load sensing, etc.

In the drawing, each triangle symbol represents a user interface (UI) device. For lighting purposes, such devices are often referred to as lighting controllers. Examples of lighting controllers include ON/OFF switches and dimmers. For systems using more advanced lighting devices, user interface devices serving as the lighting controllers may also provide a mechanism for color selection of the lighting output(s). In a system such as that illustrated in the drawings, the user interfaces may provide input (and output) for the user in any convenient or desirable form, in relation to the lighting functions, in relation to other functions monitored or controlled via the system (e.g. HVAC and/or any industrial/commercial equipment running on the premises) and possibly for access to external information and/or controllable resources via the Internet. Advanced examples of user interfaces include touchscreen display devices as well as audio input/output devices, various other video input/output device; gestural input devices, etc.

The drawing of FIG. 4 also shows several other types of devices, represented by five-pointed stars and generally referred to as third party devices "PD" (see legend). These PD devices represent in one general class the wide range of the other non-lighting-system devices that may utilize the lighting system for communication purposes and may interact with elements of the lighting system (similar to 19 in the examples of FIGS. 1 and 2).

Logical associations allow elements to be linked together, for example, based on a control grouping, based on similar properties, based on proximity, a variety of other criteria and/or combinations of any or all such properties. FIG. 4 shows a number of logical groupings. For example, the lighting system elements (EF, L, S and UI) as well as the third party (other) devices PD in each room are shown grouped together in logical 'room' sub-networks. As another illustrated example, wall controller type user interface (UI) devices in a floor or building might be logically linked in one grouping to offer the ability to create an overall view of the lighting operations users have selected throughout the floor or building. As another example, all lighting related sensors and/or all sensors of any other type may be linked together in a logical grouping to allow reporting of one or more detected conditions on an overall basis across the premises or some portion (e.g. one floor) thereof. Similarly, enhanced fixtures and other luminaires throughout a premises may be logically grouped together in a logical lighting devices or 'luminaires' sub-network, for example, to enable a central overseer functionality to assist in commissioning or other set-up of such devices and/or to provide any desired unified on-premises monitoring or control with respect to such lighting devices. In a similar fashion, one or more groups may be set up with respect to third party (other) devices PD that communicate through or with the elements and network of the lighting system at the premises.

FIG. 4 also depicts all lighting system elements and all third party devices at the premises logically grouped together in a floor or building wide network, e.g. encompassing a major portion of or an entire premises, similar to the logical house network grouping of FIG. 3. Such a wider sub-network association may facilitate coordinated functions across a wider portion of the premises, i.e. across all of the rooms and the corridor in our example of FIG. 3, e.g. to turn-out all lights and reduce temperature in all areas at a pre-set bedtime or when the user turns out the last light in the bedroom at night. For an enterprise that closes at a particular time, as another example, all lighting except emergency, security and/or exit lights throughout the floor/building network may shut down at a set time shortly after the designated closing time, when all employees of the enterprise are expected to have departed the premises. Any appliances in the enterprise may be controlled in a manner coordinated with such lighting control. As another example, in an emergency (detection of a fire or the like), the lighting in all of the rooms may come on at once whereas the lights in the corridor might flash in a coordinated sequence to lead people to the emergency exit from the space. Concurrently, if the fire relates to a fire or smoke detection, a sprinkler system might be activated while other water output devices (faucets, washing machines, etc.) might be turned off to avoid reducing water pressure to the sprinklers.

Physical networking arrangements such as discussed above relative to FIG. 3 may be established as part of a network discovery procedure. Network discovery may be automated or may entail some manual interaction by technical personnel or the like, e.g. to input any passwords or keys utilized to access wireless links/interfaces provided or used by the intelligent elements of the lighting system. Various logical groupings, such as discussed relative to FIGS. 3 and 4, may be established as part of a commissioning and/or provisioning procedure.

In some arrangements, some or all of the other devices may utilize the elements of the lighting system and the associated network largely as a data access hub, e.g. to tunnel through the lighting system 10 to the WAN 61 with little or no interaction with system elements other than as may be desired to insure authentication and authorization for security purposes or the like. With such an approach, minimal network discovery and configuration of the other devices may suffice.

For some of the other devices, however, the outside communication may be more effective if supported by a logical grouping within the premises. Also, some of the devices and/or features thereof may take advantage of the processing capabilities of the intelligent light system elements. In these later types of situations, the other devices may be commissioned to interact with the lighting system elements, where the device commissioning operation is similar to or a subset of the procedure for commissioning intelligent lighting-related elements as parts of the system at a particular premises.

Hence, it is envisioned at that at least some installations of a lighting system of the type described herein may involve communication of at least some of the other devices 19 at a particular premises 12 with the processor of one or more of the intelligent lighting system elements 11, 13 or 15 at the premises. Such interactions may facilitate set-up of the other device(s) 19 to communicate via or with the system 10, for example, where one or more of the intelligent lighting system elements 11, 13 or 15 at the premises acts as a central overseer to assist in commissioning of such other device(s) 19. In other cases, one or more of the intelligent lighting system elements 11, 13 or 15 may provide an application function related to some aspect of the operation of a particular type of device 19. In many of the central overseer type implementations and/or application function type arrangements, the one or more intelligent lighting system elements 11, 13 or 15 involved can be configured to operate as a server with respect to a client functionality of other non-lighting-system devices 19, to deliver a processing operation in support of operation of a processor of any of the other devices 19.

The processing by elements of the lighting system in support of processor operation or for a non-lighting system device 19 could reside in a single lighting system element, e.g. in a single lighting device 11. However, it may be advantageous to implement such processing by the lighting system on a distributed processing basis.

As discussed above, some lighting devices and possibly one or more of the lighting controllers and/or lighting related sensors of the lighting system 10 include wireless data communication interfaces. Although the interfaces may utilize readily available standardized wireless communication technologies, the wireless interfaces as well as compatible devices within the premises will typically operate at relatively low power. However, because there are sufficient wireless access nodes provided by the lighting system elements there is sufficient coverage throughout a substantial portion and possibly all of the premises to allow other devices in the various areas of the wirelessly premises to communicate through the those lighting system elements and the backbone data network of the lighting system. In this way, the wireless communication and network aspects of the system 10 enable other devices 19 to access and communicate through the wide area network 61 outside the premises 12. In some examples of arrangements of the system 10, at least some type(s) of other devices 19 also may communicate with intelligent lighting system elements 11, 13, 15 at the premises for processing in support of the operation(s) of such other devices. For example, for some functions associated with the other devices 19, one or more of the intelligent lighting system elements 11, 13, 15 may operate as a server with respect to client functionality in the other devices(s) 19. For example, the server functionality may work as a central overseer (CO) to assist in set-up of devices 19 on the system 10 and/or provide intermediate functions between the devices 19 and equipment outside the premises (e.g. server relative to the device client functions in the premises, and either client with respect to an external server or server with respect to an external client terminal).

Although other communication models may be used, we will assume a client-server communication relationship between a device 19 and a lighting system element 11, 13 or 15 providing a processing function for that device 19. There could be a single server function provided on one system element 11,13 or 15, e.g. to provide assistance to a particular type of device 19. Depending on the functionality and/or the processing load required for the functionality supported in the lighting system element(s), however, a number of the intelligent lighting system elements may be configured to perform the processing operation to support an operation of a processor of other device(s) 19 in a distributed processing manner using processing and/or memory resources of each of some number of the intelligent lighting system elements. The distributed processing may be implemented as distributed instances of server software/functions, and/or the distributed processing may be implemented as resource sharing amongst the involved intelligent lighting system elements.

Hence, the example will assume two or more instances of relevant server programming. Although the server programming may reside and run on UI devices and/or standalone sensors, in our example, the server programming instances 81C and 81D reside and run on two of the lighting devices, as shown at 11C and 11D respectively. Other than the server programming the lighting devices 11C and 11D are essentially the same as the lighting devices 11 discussed above relative to FIG. 1. Hence, each lighting device 11C or 11D has a light source 18C or 18D, a processor 21C or 21D, a memory 23C or 23D and a communication interface system 24C or 24D. Each communication interface system 24C or 24D will at least provide a communication link with the media forming the on-premises network 17 for the lighting system 10. Each communication interface system 24C or 24D may or may not support low power wireless communication directly with other devices 19. Although not shown, one or both of the lighting devices 11C, 11D may include an integrated sensor similar to the sensor 15A in the lighting device 11A in the earlier drawing.

Some operations of the intelligent lighting system elements may involve a server functionality. Although system element(s) running the server instance(s) for lighting system related functions could run on other system elements, for ease of illustration and discussion, the lighting devices 11C and 11D also run the programming to perform server functions with respect to client programming 89 running on some or all of the other intelligent lighting system elements. Although on the same hardware platforms 11C, 11D, the server functionalities for lighting system operations and for operations with respect to other devices may involve execution of one, two or more server programs on each platform.

Hence, for discussion purposes, the example of FIG. 5 shows other system elements 83, which here correspond to others of the lighting devices 11, UI devices 13 and standalone sensors of the earlier example that are configured as clients with respect to the particular server function(s) for lighting system purposes implemented on the devices 11C and 11D. Each element 83 will include a user interface, a sensor and/or a light source (as in the earlier illustration, but not separately shown in FIG. 5). Each element 83 includes a processor 85, a communication interface 86 and a memory 87, similar to components of the system elements 11, 13, 15 in the earlier example. Of note, the memory 87 of each such element 83 stores a client program 89 for interaction with an associated server program 81C or 81D. The communication interface systems 86 will at least provide a communication link with the media forming the on-premises network 17 for the lighting system 10; and many of the interface systems 83 also include wireless data communication interfaces in the respective interface systems to support low power wireless data communications for the other devices 19.

The other devices 19 are similar to those shown in FIG. 1. Again, each device 19 includes a processor 51, a memory 55 and appropriate device electronics 59. A device 19 may also include one or more input and/or output (I/O) elements 57 for a user interface. Each of the other devices 19 that will communicate with or through the system 10 also includes at least one wireless (W) communication interface 55 that is compatible with the wireless communication capability offered by the particular installation of the lighting system at the premises. The electronics 59 and the programming in memory 53 run by the processor 55 to control operation of each particular device 19 will depend on the particular type of device product. Those of the other devices 19 shown in the example of FIG. 5 (those that will access the server functionality), also have client programs 91 stored in the memories 53 for execution by the respective processors 51. The client programs 91 may be similar to the client programs 89, or the programs 89, 91 may be different (e.g. if accessing different server instances or different server functions).

The other devices 19 may access the wireless communications interfaces in the system elements and through those interfaces the networks 17 and 61 (FIG. 1), essentially in a pass-through manner, with little or no interaction with the system 10 other than data transport. In a WiFi example, this would be the operation if the wireless communications interfaces and associated control functionality were set-up to operate much like a public WiFi hotspot with no security requirement and no log-in requirement. However, such an arrangement has very low security, from the perspective of the system 10; and such an arrangement leaves the operator, vendor or maintenance enterprise affiliated with system 10 little or no control over use of the communication facilities of the system 10 by other devices 19 and the users of such devices 19. Hence, it may be preferable to commission the other devices for operation via the system 10 in a more sophisticated manner. Such commissioning is an example of one type of function that may be performed by a server implemented in a lighting system element, such as an instance 81C, 81D of a server functionality executing on a lighting device 11C or 11D. In such an arrangement, the server functionality may operate as a central overseer for device set-up and/or as a controller with respect to some or all of the other devices 19 and/or with respect to some or all of the other lighting system elements 83.

By way of another example, some lighting system element operations and/or some operations of the other devices 19 may utilize other types of server functionality, e.g. to obtain additional information or other resources in support of processing operations of the system element 83 or the other device 19.

A single instance of a server running on one system element may at times be stressed by high processing demands. Also, a system that utilizes a single server instance for a crucial system function or service may be vulnerable to interruptions, e.g. if there is a failure of the element or of communication with the element running the server instance. To address such possible concerns, a system 10 can run some number of separate instances of a particular server functionality, in parallel with one another on multiple intelligent system elements. Each such server instance would utilize a copy of the relevant server programming and a copy of any data or database needed for the particular system service. Use of multiple instances of the servers may also speed up response time when interacting with clients implemented on the other system elements.

To the extent that data used by the server functionality may change over time of operation of the system 10, the server instances would coordinate with each other to update the copy of the data/database at or used by each instance of the server, e.g. to maintain synchronism as between multiple instances of the relevant data. FIG. 5 is a simplified illustration of such an arrangement. Alternatively, the data used by the server functionality may be stored in a distributed manner across multiple elements (e.g. as distributed hash tables) to minimize the synchronization operations.

Hence, in the example, two of the lighting devices 11C and 11D run instances 81C and 81D of server programming for execution by processors 21C and 21D thereof. The server instances 81C and 81D configure those lighting devices 11C, 11D to operate in a distributed processing fashion to implement a server function with respect to an overall processing functionality and related server communications via the data communication network, generally represented again by the cloud 17. The overall processing functionality offered by the server instances 81C, 81D may be a lighting system functionality, e.g. as used or consumed by lighting device clients 89; and/or the overall processing functionality offered by the server instances 81C and 81D may be a functionality as used or consumed by other non-lighting system device clients 91.

The server program instances 81C, 81D are represented generally by icons similar to hardware devices such as server computers; but the program instances 81C, 81D are actually server programming stored in memories 23C, 23D for execution by the processors 21C, 21D (hence, the servers 81C, 81D are shown in dotted line form). As outlined earlier, the processing function of the system implemented by such server instances may relate to a CO functionality, some type of controller service, a central communication function/service, or a processing service related to operations of processors 51 of other devices 19. Also, although only two instances 81C, 81D of each server program are shown, there may be any appropriate number of such instances for implementation of a particular function or service in a system of a particular size and/or complexity. Also, for different functions, there may be other servers running as multiple instances of other server programs running on the same or different lighting system elements.

The lighting devices 11C and 11D are shown in this drawing as examples of intelligent system elements that may store and execute server programming instances. It should be noted, however, that intelligent sensors, user intelligent interface devices or other intelligent elements of the system 10 (FIG. 1) or communicating through the on-premises data network of the system 10 may store and execute server programming instances instead of or in addition to the intelligent lighting devices 11C and 11D. One set of server instances may implement the server-side aspects and communications with respect to one or any number of system functionalities. However, other processing functionalities of the system 10 may utilize server program instances stored in and executed on other system elements.

At least with respect to the particular overall processing function of the system 10 supported by the server program instances 81C, 81D, the server program instances 81C, 81D interact with some number of other non-lighting-system devices 19 and/or some number of other intelligent system elements represented generically at 83. The other elements 83 can be any of the types of intelligent system elements discussed above; and the other devices 19 can be any type of non-lighting-system device discussed earlier.

As shown in FIG. 5, various other intelligent system elements 87 will include client programming 89 stored in memories 87 thereof for execution by the processors 85 of the other intelligent system elements 83, to configure each of the other intelligent system elements 83 to implement a client function with respect to the processing functionality of the system supported by the server instances 81C, 81D. Similarly, the various other non-lighting-system devices 19 that will also be consumers of the server functionality will include client programming 91 stored in memories 53 thereof for execution by the processors 51 of the non-lighting-system devices 19, to configure each of the non-lighting-system devices 19 to implement a client function with respect to the processing functionality of the system supported by the server instances 81C, 81D. The client programming 89 or 91 will also support related client communications with the server function implemented by the instances of the server programming 81C, 81D on the lighting devices 11C, 11D in our example. Hence, the drawing shows arrows through the network for client-server communications between the server instances 81C, 81D and the clients 89 or 91.

In a multi-instance server implementation such as shown in FIG. 5, any one server may be able to perform on its own to handle client-server interactions with one or more elements 83 and/or devices 19 independently of the other server instance(s), while each the other server instance(s) independently handles other client-server interactions with others of the elements 83 and/or devices 19. To the extent that they relate to the same overall function, however, they will often use or process some of the same data. For example, if a particular processing functionality of the system involves a database, all of the relevant server instances will manipulate that same database. In our two instance server example, to insure that both instances of the server programming 81C, 81D have access to the same state of the database if or when necessary, the server instances 81C, 81D will communicate with each other through the data communication network 17 to synchronize any separate copies of the database maintained by or for the individual server instances 81C, 81D, as represented by the Sync arrow between the server instances 81C, 81D. Any appropriate data synchronizing technique may be used.

The use of multiple server instances allows for server load distribution across multiple hardware platforms of intelligent elements of the system. The use of multiple server instances may also provide redundancy in the event of impairment or failure of a system element or communications to an element executing one of the server instances. Various load distribution and/or fail-over techniques may be used.

The server functionality can provide processing operations in support of operations in non-lighting-system devices 19 in a variety of ways. For example, if a device 19 needs additional information to implement a task, it may request that information from one of the server instances 81C or 81D. If the server does not have the information, the server in turn may obtain the information from another source via the outside network 61. As another class of examples, the processor of a low-end 'brain' in a device 19 may not itself have the processing or memory resources to perform a task and may instead seek assistance from the server 81C or 81D, either sufficient to complete the task or as an interim assistance before seeking a final processing outcome. Speech or optical processing of user inputs are examples of this later class of server assistance. The device 19 may receive the relevant input, e.g. audio, and send digitized audio information to the server 81C or 81D. The server may fully recognize any spoken commands in the audio data; although more likely, the server 81C or 81D would parse the audio and possibly recognize words. The server or the device itself could then send the processed information to a server of the device manufacturer or the like on the network 61 to determine the precise input command and thus how the device 19 should respond. Similar processing can be provided with respect to optical input to recognize a gesture and provide an appropriate instruction to the device as to how to respond to a user's gestural input.

As outlined above, the intelligent component of the non-lighting-system device 19 has data communication to/through the fixture or the like of the lighting system and uses the lighting system's on-premises backbone data network 17 for data communication transport for the smart element of the appliance or the like. The lighting system 10 provides a standard data communication interface, typically wireless at low power. The other devices 19 for the premises can all be built to the standard lighting system network interface standard, e.g. to use the particular low power wireless standard. The other devices 19 need not be built to support many different standards and/or rely on a dedicated network deployed specifically for data communication purposes. The network features of the system may be sufficiently intelligent to detect each new device and negotiate communication rights. In addition, it may be advantageous to provide a relatively 'open' software architecture, e.g. so that the system supports a standard application program interface (API) at least for network interface/communications. With such an approach, application developers can draft different applications for the lighting system elements and/or for the other smart devices in the premises.

Both for telecom and for software, the issues relate to interoperability of the other devices 19 with and through the system 10, so that other devices 19 talk to the system elements as deemed appropriate, although different policies or permissions may limit the ability of one or another of the device 19 to communicate with or through the system 10. For example, some devices 19 may have applications and permissions to control lighting, whereas other devices 19 communicate through the lighting elements and the network 17 to their associated outside systems but do not control lighting or look to lighting system elements for supportive processing functions.

To further appreciate the relationships and interactions, it may be helpful to consider logical relationships or stacks as may be involved in programming and/or communications. A telecommunications protocol stack may be logically considered as having as many as seven layers. A software stack may have fewer layers, for example a physical layer for device drivers or the like, and operating system (OS) with one or more application programming interfaces (APIs) for higher layer applications. In the telecommunication stack, the OS and above are all part of the 'application' layer.

FIG. 6 is a logical diagram of a program stack, for programming which may be used in intelligent system elements for an implementation of a lighting system such as that discussed above relative to FIGS. 1-5. A similar logical stack, or at least elements thereof, may be implemented in non-lighting-system 19, particularly those that will communicate with server functionality provided by the system elements 11, 13, or 15.

At its most basic level, a processor may be considered or modeled as a state machine, as shown at the lowest layer of the stack in FIG. 6. In its simplest form, a state machine will switch between states in response to different sets of signals or values on its inputs. Core processing functions may be just above but near to the state machine level. The core function layer, for example, may implement the driver and/or interface functions for converting between the inputs and outputs of the state machine and the signals produced by or used to drive any input and/or output components of the intelligent system element. The core functions also provide a program interface between the state machine and the higher level programming.

Logically speaking, several layers of software programming run on top of the state machine and core processor functions, in our example. The next highest layer may be a real-time operating system (RTOS) configured to service real-time application requests or interrupts, or the next layer may be a more computer-like operating system (OS). The top two layers in the exemplary stack represent applications running on top of and thus through the operating system layer. Part or a sub-layer at the applications level of the exemplary stack is for applications for advanced operations (Ops). Resource sharing type distributed processing, as will be discussed later relative to FIG. 7, for example, may be implemented via an advanced ops program application. Client programs 89, 91 and server programs 81C, 81D are additional examples of application layer programs.

The top layer of the software stack is a general application layer. Any of a wide variety of applications may reside and run at this layer of the logical program stack. The CO/controller services and the responsive operations of the system elements may be implemented at the application layer. Similarly, server functionality supporting the client operations of the processors of the non-lighting device 19 may be implemented at the application layer. Hence, the top layer in our example includes some applications by or controlled by the system vendor, for example, to support system services that the vendor designs the system to provide. For example, the vendor application layer may include the client 89 or 91 and/or a server instance 81C or 81D for a particular CO, controller or communication service of the system 10 and/or for a server function consumed by devices 19.

For some purposes, the software protocol stack and aspects of the programming/configuration at various layers are defined and secured by the system manufacturer. It is envisioned that the system 10 will be open to third party application and/or device developers. In an open system, third parties will be able to build devices that utilize the system and its protocols for operation including interactions with elements provided by the system manufacturer. In such a system, the system manufacturer may opt to allow third parties some access to program or otherwise interact at various layers of the stack, for example, to allow third parties to manufacturer and sell other system elements or non-lighting-system devices 19 for use on the system 19 and/or to allow third parties to write client and server applications for the system. Hence, the highest layer in our example also may include applications (Apps) by other providers, for example, third party software developers. Manufacturers of other system elements and/or other non-lighting-system devices intended for operation on or through the system are allowed to write application layer programming for their own server functions and associated client functions, to allow the system vendor's elements 11, 13, 15 (or 83) to interact with elements on the system of non-lighting-system devices 19 developed by other vendors.

The discussion of FIG. 6 focused on the software architecture. The open approach to the system configuration, however, may also extend to the protocols utilized for communications. To provide a framework for this part of our discussion, it may help to consider a model of a protocol stack. The Open Systems Interconnection (OSI) model defines a seven layer-stack. The OSI reference model is not itself a network architecture. Rather it specifies a hierarchy of protocol layers and defines the function of each layer in the network.

As a logical matter, operations or functions at each layer performed on one device communicate only with the functions at that layer performed on another device, in accordance with a protocol defining the rules of this communication. However, to achieve such communication across a network, the operations or functions at the layer transfer information down from layer to layer in one through the lower layers of the stack on the device, then through the channel medium of the network, and up from layer to layer of the lower layers on the other device to reach and communicate with the same layer on the other device. With this approach, it is easy to consider each of the layers as communicating with its counterpart at the same level, in a "horizontal" direction, for purposes of design of the various layers and understanding their functions.

The bottom layer of the OSI stack model is the physical communication layer, which deals with physical and electrical aspects of the protocol. The physical communication layer provides transmission of raw data bits over the physical communication channel through the particular network.

On top of the physical layer, the next layer is the data link layer, which provides services to enable transfer of data between network entities via the media used at the physical layer. The data link layer transforms the physical layer, which interfaces directly with the channel medium, into a communication link that appears error-free to the next layer above. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) sublayer. This sublayer determines which station should get access to the communication channel when there are conflicting requests for access. The functions of the MAC layer are more likely to be dependent on the nature of the transmission medium.

In the system 10, the interfaces to network 17 in the various communication interface systems of elements 11, 13, 15 will implement physical and data link layer protocols that correspond to the technology adopted for the system's data network 17. However, the various communication interface systems of elements 11, 13, 15 that support wireless communication will implement physical and data link layer protocols that correspond to the technology adopted for wireless communications with the non-lighting-system devices 19. The wireless (W) communication interfaces in the non-lighting-system devices 19 will similarly implement wireless physical and data link layer protocols that correspond to the technology adopted for wireless communications.

On top of the data link layer, the next layer is the network layer, facilitates the transfer of data to a host on another network while maintaining a desired level of quality of service. The network layer provides capabilities required to control connections between end systems through the network, e.g., set-up and tear-down of connections. Internet Protocol (IP), for example, may be implemented in the network layer of the OSI model. An IP address therefore is associated with protocol services at the network layer.

On top of the network layer, the OSI model specifies a transport layer protocol, which provides reliable control of data transfer between end systems. The transport layer, for example, may provide error control, flow control and/or data segmentation. TCP (Transmission Control Protocol) and UDP (User Datagram Protocol) typically run at the transport layer on top of network layer IP.

Above the transport layer, a session layer is responsible for establishing and managing communication sessions between presentation entities, that is to say between entities operating at the next higher layer of the protocol stack. For example, the session layer determines which entity communicates at a given time and establishes any necessary synchronization between the entities. Above the session layer, a presentation layer serves to represent information transferred between applications in a manner that preserves its meaning (semantics) while resolving differences in the actual representation (syntax).

A protocol that is specific to the actual application that utilizes the information communicated runs at the top of the protocol stack. Hence, the top layer of the stack is referred to as the application layer. However, it should be noted that the application layer for telecommunications purposes includes concepts other than the top layer applications of the software stack. For example, the operating system (OS) and all programming running on or above the OS in the software stack are all part of the 'application' layer of the telecommunications stack.

In actual system implementations, two or more of the layers of the communication stack may be combined into functions of a smaller number of layers or into just one layer.

It is envisioned that the system manufacturer will likely specify (and secure) some particular application layer functions, for example, for basic system operations and maintenance; and such an arrangement will limit the configuration that is stored for that portion of the application layer.

However, as discussed relative to FIG. 6, it is also envisioned that the system 10 will be open to third party application and/or device developers. Third parties will be able to build devices 19 or alternative system elements that utilize the system and its protocols for operation including interactions with elements provided by the system manufacturer.

The open approach, for example, may also enable a customer that will own or occupy a particular premises having a system 10 to purchase and install third party devices for lighting devices, lighting system controller or lighting related sensors and/or to purchase additional programming for desired functions different from (or possibly competing with) those offered by the system manufacturer. The open approach also allows a wide range of third parties to develop non-lighting-system elements 19 that communicate through and possibly interact with the elements 11, 13 and/or 15 of the lighting system 10 and to develop a wide variety of application programming for those devices and/or any associated server functionalities or the like intended to run on the system elements 11, 13, 15.

The degree of third party access to the layers of the program or telecommunication protocol stacks may vary amongst third party vendors. A trusted or 'certified partner' may have access to more layers, whereas non-certified third parties may only be allowed to connect to the media and write application layer programming that otherwise conforms to the application layer programming interfaces to the lower layers of the stack.

Users of different types may also be granted access to different amounts of the stacks, particularly the program stack. For example, a government entity with a high degree of sophistication and a need for security may have greater access to control its system, whereas a small business enterprise may only be allowed access to adjust its system operations at the application level.

Many of the intelligent functions of the lighting system elements discussed above can often be performed using the processing and memory resources of one involved system element. A lighting device 11, for example, can receive, process and respond to a command from a user interface device 11 by appropriately adjusting the output of the light source 18 of the particular device 11. The server functionality may be executed in a single intelligent lighting system element. The exemplary system 10, however, implements distributed processing. One type of distributed processing is the use of multiple instances of a server functionality 81C, 81D.

Even where implemented on a distributed processing basis, by multiple instances of the server 81C, 81D, processing at one element may be sufficient to complete a particular processing operation for serving a client request. For example, when a newly installed device 19 requests commissioning assistance from one of the servers 81C, 81D, that server may be able to provide the information to the requesting client 91 in device 19, e.g. from data at the server or by requesting data from another source via the network.

However, the system 10 at the premises 12 may implement an additional or alternative form of distributed processing involving a processing and/or memory resource sharing functionality. Resource sharing involves an element with a processing job asking for and obtaining help from other system elements. Some processing operations of one or more of the elements of the system 10 may require more processing resources or memory resources than are available at a particular lighting system element. The system 10 therefore may be configured to support any such operation that may be more resource intensive via the resource sharing. The system may implement resource sharing for lighting system operations, e.g. to process complex sensor data at one element or across a large premises and determine how one or more of the system elements should respond thereto. The system may also implement resource sharing in support of server operations. To the extent that a server task for a centralized service is amenable to distributed processing, the system element that also is configured as the server may distribute the server processing task to other elements. The resource sharing in support of server operations may apply to lighting system related functions, e.g. to process audio or optical inputs through system elements 11, 13, 15 to recognize and respond to user commands to control lighting or the like.

However, the resource sharing in support of server operations also may apply to functions in support of operations of other devices 19. For example, if a server 81C or 81D has a request from a client 91 in one of the devices 19, the programming executed by the particular processor 21C or 21D will allow the lighting device 11C or 11D to determine if the processing job is amenable to resource sharing type distributed processing. If so, the device 11C, 11D operating at the server interacts with other system elements to 11, 13, 15 so as to distribute the processing job, receive results, compile an overall result and then provide a response based on the overall result back to the client 91 in the particular device 19.

In the discussion of programming, it was assumed that the resource sharing type distributed processing (see e.g. of FIG. 7) was implemented at the advanced ops application layer of the stack. The server operations of the system elements are implemented at the application layer.

Figure 7:
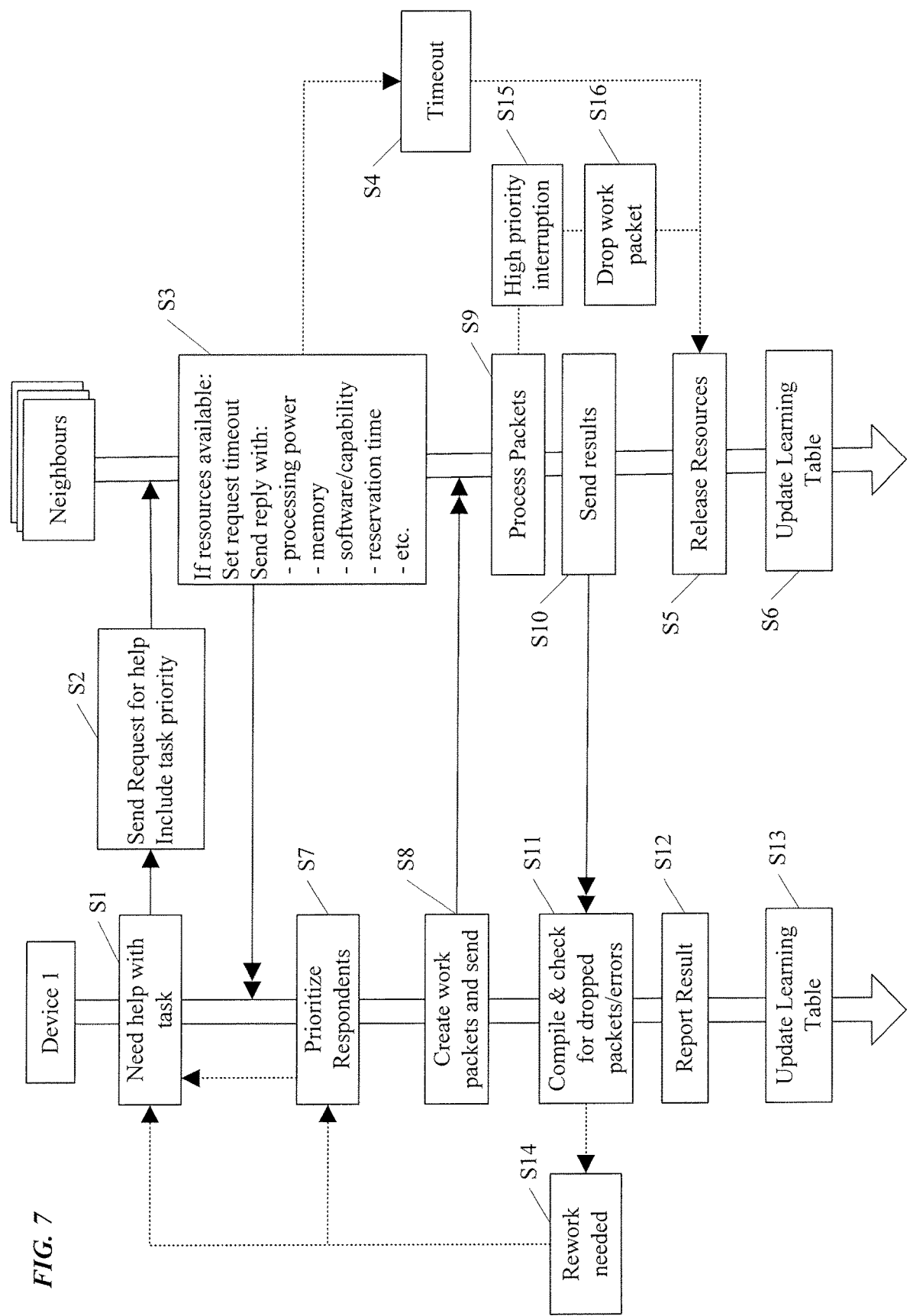
FIG. 7 is a flow chart of a simple example of a procedure for distributed processing, involving resource sharing, which may be implemented in a lighting system like that of FIG. 1.

The process flow shown in FIG. 7 represents a simple example of a resource sharing procedure for distributed processing, which may be implemented in a lighting system 10 like that of FIGS. 1-5.

In the example, a first lighting system element has a processing job to perform. The resource sharing may apply to jobs in support of lighting system operations and to operations in support of processing or the like by the other non-lighting-system devices 19 at the premises 12.

The element with the processing job to perform may be any intelligent element of the system 10, although for purposes of a specific example to discuss, we will assume that the element that has the processing job or task is one of the lighting devices, and is therefore identified as device 1 in FIG. 7. The device 1 may be any system element that may seek assistance with its own processing job; or the device 1 may be an element configured as a server having a server operation job amenable to resource sharing to assist in performance of a server-function related task. The server function may be one supporting lighting system operations, or the server function may interact with clients 91 of other devices 19.

At step S1, the lighting device 1 recognizes that it may be prudent to seek help to perform the task at hand, in this case, using resources of others of the intelligent system elements.

The device 1 can perform at least some tasks utilizing the element's own internal processor and memory. For example, a lighting device typically will be able to receive and appropriately process a lighting command, e.g. to set a light level and/or to set an associated color characteristic of the device's light source, to adjust its operational light output as commanded, without the need for resources of other intelligent elements of the system. A user interface (UI) device configured as a lighting controller generally will be able to send commands in response to user inputs to any lighting devices it controls; and, at least under most circumstances, a sensor will be able to report its sensed condition to any system elements configured to receive and utilize such information. However, other tasks may more readily lend themselves to distributed processing. Some such tasks with a potential for distributed processing may call for more processing or memory resources than readily available within the device 1 (e.g. without compromising core lighting functions of the device). Tasks with a potential for distributed processing typically will be tasks that can be handled in some reasonable fashion by some number of individual elements, e.g. can be readily split into sub-tasks for processing and/or storage in different elements, although there may be some tasks that by the nature of the processing or storage involved cannot readily be spilt amongst multiple elements. Some tasks may require faster completion than the device alone can provide with only its own resources and therefore best implemented via distributed processing. Conversely some resource intensive tasks may be relatively insensitive to time-to-completion and amenable to wider distribution for processing (e.g. processing of audio, image or video data).

As outlined above, the distributed processing tasks handled by resource sharing may relate to lighting system operations, general processing tasks associated with the system and/or tasks for other parties. Lighting tasks that may be amenable to distributed processing, for example, may relate to lighting control operations, e.g. to process data from numerous sensors and make some overall control decision. Such lighting system tasks may be implemented by an element operating as a server for one of the CO/controller services. General processing tasks of the system may include, for example, processing audio or video inputs, either for a lighting control operation in response to user input in such a fashion or for some other system function or feature (e.g. to access information or a non-lighting control function in response to the user audio or video input). A task for a non-lighting system device 19 might entail processing sensor, audio or video input data from one or more of the devices 19, to determine how the device 19 should proceed or to configure the relevant data for delivery to an outside party, either on a regular basis or in response to a specific request/instruction from the outside party other particular device(s) 19. Similar processing may be handled on a distributed processing basis within the system, to process such data received from outside the system, e.g. for distribution to other devices 19 at the premises 12.

Hence, the device 1 may have a processing job to perform in response to one or more of its own inputs or in response to an instruction or the like received another system element or from outside the system. However, if the device 1 is an element configured as a server, the device 1 may have a processing job to be performed in response to or for a communication with a client 89 or 91.

From the various factors involved in the processing task at hand, in the processing flow of FIG. 7, the device 1 will recognize that the task is one that is appropriate for resource-sharing type distributed processing, e.g. involving processor or memory intensive operations and/or not time critical, etc. Also, based on characteristics of the job, e.g. source, lighting/non-lighting function, time sensitivity, or the like, the device 1 will assign a relative priority value or level to the particular processing job. The programming and/or the protocols used for signaling between system elements that may be involved in the resource-sharing type distributed processing in the system 10 can define an appropriate format and range of values for a job priority level parameter.

The lighting device 1 will be in communication with at least some number of other intelligent elements of the lighting system 10, referred to in this process flow example as neighbors of the device 1. The neighbor elements may be other lighting fixtures, intelligent UI devices, intelligent sensors or any other type(s) of intelligent elements that are part of or communicating via the lighting system 10.

At step S2, the lighting device 1 queries other intelligent system elements, i.e. the neighbors in the example, essentially to request help in performing the processing task or job. The queried neighbors may include any number of other elements of the system 10. A small group of neighbors, for example, might be those elements logically associated with the device in some small group or sub-network, such as elements in the same room or other service area sub-network. The queried neighbors may include all system elements on the system 10 or any sub-set of elements between the smallest size group and the complete set. As discussed more later, the sending device 1 may pick and choose which of its 'neighbors' from any particular grouping to query with regard to the current job or task, based on information about element performance learned from earlier resource-sharing type distributed processing of other tasks and/or requirements for the task at hand.

The exemplary resource-sharing type distributed processing procedure includes learning features, for the device that is distributing the job and for the neighbors that respond to queries or requests to contribute resources for distributed job processing and/or that actually contribute their resources to distributed job processing. The learning process on each side of the distributed processing, job sub-task distribution as opposed to offering resources and performing an allocated sub-task, help the various system elements to adapt and optimize the distributed processing operations over time. As will be discussed at various stages of our description of the exemplary processing flow, information that has been learned from distributed processing of prior jobs informs the various elements in their decisions or responses at various stages of the process. Optimization may also involve some randomization.

For learning purposes, each intelligent system element configured to distribute portions of a task may establish, maintain and store a learning table for the distribution function; and each intelligent system element configured to offer resources to another intelligent system element and if instructed contribute such resources to a distributed processing operation may establish, maintain and store a learning table for such in-bound query response and sub-task processing. Of course, many of the intelligent system elements 11, 13, 15 (or 83) may play both roles during processing of different jobs over a period of time and may learn about both sides of the distributed processing. An intelligent system element configured to participate on both sides of the distributed processing may maintain learned data about both types/sides of the operations, either in two tables or in a combined table. If separate tables are used, each table may be adjusted in response to a change in the other, in appropriate circumstances.

In general, learning entails analysis of performance by an element and/or by other elements involved in handling of each distributed processing job to determine distributed processing metrics of performance. Examples of learned performance parameters that may be assessed in selecting other neighbor elements during the task distribution include turn-around time or turn-around time per unit of processed data, number or percentage of dropped packets, average amount of memory resources offered (e.g. bytes of storage) and/or amount of processing resources offered (e.g. in units related to data to be processed, number of processing cycles or average processing rate) and/or actually provided, during some number of prior distributed job processing operations. Examples of learned performance parameters that may be assessed in determining how to respond to a new inquiry for distributed processing assistance include amount of data processed, time required, resources used, delay incurred in processing of other tasks, or the like, for tasks distributed by the receiving device.

In general, the learned distributed processing metrics of performance allows an element to prioritize one or more lists of neighbors/other elements for use in making decisions and selections based on highest relative ranking on the applicable list. For distribution, the device 1 may select some number of the highest ranking neighbors. In contrast, an element offering to take part in a distributed task may choose whether to offer to help or how much if any of that element's resources to offer based on the ranking of the particular requesting device 1, based on learned distributed processing metrics of performance. With such an approach, an element tends to select or respond most favorably to the highest ranked element(s) in the particular prioritized listing, in an effort to optimize operations.

When decisions in the process (e.g. FIG. 7) are made based on the learned performance metrics about other elements, however, the element making the decision can introduce a random variation in the decision, for example, to select or respond to a lighting device or other element that has not or seldom been chosen or favored at the particular decision point in the past. As a result, the element making the selection or response will from time to time randomly select or favor another element that would otherwise appear as less than optimal based solely on the previously learned performance information. However, this allows the selecting or responding element to learn more about the randomly chosen element for future processing purposes and update the parameters in the learned table(s) for optimization of future distributed processing operations. A random variation of this type, for example, may allow the element making the decision to discover changes and adjust its learned information accordingly, for better optimization of future distributed processing operations.

Returning to the process flow of FIG. 7, in a particularly intelligent implementation of the resource-sharing type distributed processing, the device with the task to distribute can select among elements in some group or sub-group based on performance data about elements in the group or sub-group learned from prior job distribution operations for sending the query in step S2. The learned performance parameters for job distribution enables the device 1 to prioritize a list of neighbor elements for job distribution and to query some number of the highest priority elements likely to offer and provide sufficient resources to handle the particular task at hand. Only a few may be chosen from the high-end of the priority list for a small task, whereas the sending device 1 may select more or all of the neighbors to query for a larger task. As the process is repeated over time for multiple distributed processing tasks, the device 1 will tend to most often choose the other elements that are rated higher for performance based on the learned performance parameters, for the query step. Lower rated elements will be selected less often. However, the priority for such selection for the query step S2 may change over time as conditions at other elements change and the sending device 1 updates its learned performance metrics accordingly; and the occasional randomization of the neighbor selection can enhance the process of learning about changes.

The device 1 sends the query message through the network media used in the relevant portion(s) of the system 10 installed at the particular premises 12, to the neighbors chosen initially for purposes of the inquiry about the current task processing. The inquiry, for example, may be sent as a broadcast, sent as a multicast to selected neighbors or sent as individual data messages to each of the selected neighbors, depending on the network media and/or data communication protocols utilized by the particular system implementation.

The request message for the query in step S2 will include at least some information about the current job, including the assigned job priority level. The information in the query, for example, may also provide various metrics about the task at hand and/or the sub-tasks thereof being distributed to other elements. For example, such information may indicate the type of processing involved, the type/format of the data to be processed, any time constraints or deadlines for sub-task completion, the overall amount of data or the expected sub-divided amounts of data to be processed by recipient neighbors, or any other parameters about the task that may be helpful in enabling the queried neighbors to determine how to respond to the query. The information about the current job may also include a job or task identifier.

Each queried neighbor element will analyze the information about the job from the query message it receives from the device 1 in comparison to its own resources, current data processing operations, status or the like. For example, the receiving element may compare the priority of the task that is to be distributed to the priority or priories of any of its own tasks in progress or any distributed processing sub-tasks the receiving element may already be working on for other source elements. The receiving element may also analyze factors about the task that is to be distributed, versus what if any of its own resources that element might offer and allocate to the task, in view of its ongoing processing operations and any expected higher priority tasks. For example, if the receiving element is a lighting device, that receiving element may be able to offer some resources to handle part of the task but still reserve sufficient resources to address a command to change a light setting if received while working on a part of the task.

Neighbor elements that do not have (or for various reasons will not offer) resources may not respond to the query. Alternatively, such unavailable neighbor elements may send responses, but their responses in such cases would indicate that they are not offering resources to assist in performance of the distributed processing job currently offered by the device 1. In the example, the device 1 will adjust its learned table about its neighbors to reflect any neighbors that do not offer to assist in the distributed processing job, e.g. to indicate other elements did not respond or indicate any reason given in a response declining to participate.

Each receiving element that has resources available will set a request timeout and send a reply message back through the network to the device 1 (S3). This period essentially is a time limit during which the neighbor will wait for further instructions about the job. However, if the timeout period expires (S4) without follow-up instructions about the job from the device 1, then the neighbor will release the promised resources at step S5, in this scenario, without having processed any part of the task at hand. In this way, the unused resources are available for other uses by the neighbor or for other distributed processing operations. After releasing the resources, the neighbor element will update its learning table about distributed processing offered by other elements, as shown at S6. In the timeout scenario (that passed through S4), for example, the neighbor will update its learned performance metric information about device 1 to reflect that device 1 did not send a sub-task to the neighbor after the neighbor offered resources in response to the query. The neighbor can use such performance metric information in future to adjust its responses to future queries from device 1.

Returning to step S3, as noted, at least the neighbors that have and will offer available resources send back a reply message, which is received at the device 1. Each reply from a device offering to participate in the distributed processing operation will include information about the resources of the neighbor element which that element is offering to make available for sub-task processing of the currently offered job. Examples of such available resource information include: processing power, memory, software/capability, reservation time, etc. Each reply may also indicate the relative priority of any local task or prior distributed processing task that is already in progress on the responding neighbor element. In this step S3, the requesting device 1 will receive similar replies from some number of its neighbors, indicating whether or not the other intelligent system elements have processing or memory resources available for the processing job. In our example, at least some of the replies from neighbors offering available resources provide information about the resources that each other element offering to help in the distributed task processing can make available. In the example, the device 1 will adjust its learning table about its neighbors to reflect those neighbors that offered to assist in the distributed processing job and/or to reflect the resources each such neighbor offered in response to the inquiry sent in step S2.

In step S7, the device 1 with the task to distribute analyzes potential candidates for distributed processing of the task, for example, to prioritize a list of the neighbor elements that responded (respondents, in the drawing). The device 1 can prioritize the respondents based on information contained in the responses, for example, based on information about the resources each is offering and/or priority of any other tasks the respondents are already processing. The device 1 can also prioritize the respondents based on learned information regarding performance metrics of the respondents that the device 1 selected and used to assist in prior distributed processing operations.

The device 1 in our example will also know the priority and requirements of the data processing task that the device 1 is trying to distribute. From the prioritized list created in S7, the device 1 can now select an appropriate number of the respondents starting at the highest rank and working down through the list to select a sufficient number of the respondents to provide the resources to meet the requirements of the particular data processing task.

The device 1 essentially allocates portions of the processing job to the selected respondent elements. Hence, at step S8, the device 1 creates work packets for the selected respondents. By work packets here, we do not necessarily mean IP packets or the like, but instead are referring to sets of instructions and associated data for the portions of the job that the device 1 allocates to the selected respondents. For large processing jobs, for example, in a system using IP packet communications over the network media, each 'work packet' for a sub-task allocated to a selected respondent may utilize some number of IP packets addressed to the particular respondent neighbor element. The device 1 may send one, two more work packets to each of the selected respondent neighbor elements. In our example, the distributing device 1 stores a record of each work packet and an identifier of the neighbor element to which device 1 assigned the particular work packet.

The work packets created for each selected respondent may be tailored to the particular respondent. For example, respondents offering more processing or memory resources may be sent more of the data to process. Respondent elements with particularly advantageous capabilities (e.g. a video processor not currently engaged in another processing task) may receive task assignments particularly suited to their capabilities. The allocations and associated work packet creations also may be adjusted based on the learning table. For example, if a particular respondent has performed better in the past when handling a somewhat smaller data allocation, the device 1 may limit the data allocation for that element accordingly.

In the process flow of FIG. 7, in step S8, the device 1 sends the work packets to the selected respondents through the network communication media of the lighting system 10. Although not shown for convenience, the system elements may be configured to require an acknowledgement of each work packet. In such an arrangement, a neighbor would send an acknowledgement message back through the network to the distributing device 1. If no acknowledgement is received from a particular neighbor, after some number of one or more re-tries, the distributing device 1 could select a lower priority neighbor from the list used in step S8 and try sending the undelivered work packet to the alternate neighbor in a similar fashion. Each work packet sent/delivered to a neighbor will include a portion of the data to be processed for the particular task as well as instructions as to how the data in the work packet is to be processed, essentially to enable each respondent to perform an allocated portion or sub-task of the distributed processing job. Each work packet may include an identifier of the overall processing job and/or an identifier of the particular assigned sub-task.

At this point in the discussion, we will assume that each intelligent system element that receives a work packet for an allocated portion of the distributed processing job will successfully complete and return results for the portion of the job allocated thereto. Several scenarios in which work packets are dropped without sub-task completion will be discussed later.

Hence, at this point in our exemplary process flow, each of the neighbor elements that the device 1 selected for a sub-task receives one or more work packets containing data and instructions for that sub-task as part of the communications in step S8. The element receiving the work packet performs its allocated portion of the processing job on the received data, in accordance with the instructions, using resources of the processor and/or memory of the receiving element of the lighting system (step S9). At step S10, each selected respondent neighbor element sends a result of its sub-task processing back through the data communication network of the system 10 to the device 1. In our example, each of the work result packets sent back to the distributing device 1 includes an address or other identifier of the responding neighbor element that performed the sub-task as well as an identifier of the overall task/job and/or an identifier of the respective sub-task.

Upon sending sub-task results in step S10, each respondent neighbor element will release the resources utilized in processing the sub-task, at step S5. The resources become available again for other uses by the neighbor or for other distributed processing operations. After releasing the resources, the neighbor element again will update its learning table about distributed processing (at S6), in this case, the sub-task processing that the element performed for the device 1. In the completed sub-task scenario, for example, the neighbor will update its learned performance metric information based on analysis of the task of device 1 to reflect the size of the assigned sub-task, the amount of resources and/or time utilized, what if any other tasks of the respondent neighbor element were delayed during this distributed processing operation, or the like. The neighbor can use such learned performance metric information in future to adjust its responses to future queries from device 1.

Returning to the result transmission step S10, as a result of the transmissions from the neighbors selected back in step S10, the device 1 will receive processing results or the sub-tasks from other intelligent system elements. In step S11 in our example, the device 1 compiles the received results and checks the composite result to determine if any work packets were dropped or if there are any readily apparent errors. Sub-task identifiers and/or a combination of the overall task identifier and the neighbor address/identifier may assist the device 1 in combining sub-task results from the various participating neighbor elements into the appropriate overall composite result. At this point in our discussion, we will assume that no packets were dropped and no errors are detected. Hence, the compiling of the results of the allocated sub-task processing from the other system elements assisting in the current distributed processing operation essentially determines an overall result of the processing job.

Processing by the device 1 proceeds to step S12, in which the device 1 reports the overall result. The report function here is given by way of just one example of an action that the device 1 may perform based on the overall result of the processing job. The report may be sent to a higher level processing element or service, e.g. a higher level control service 57 or to an outside system management device 53 or 57. However, where the device 1 is also a server with respect to a client 89 or 91, the report may be a transmission of the processing result or a command or the like corresponding to the result back to the particular client 89 or 91.

As other examples, reporting the result may involve taking some action in the device 1, accessing data via the network, sending a face or voice recognition result to an outside device of another party, etc. Of course, the device or any other system element may act in any of a variety of other ways based on the overall result of the distributed processing operation.

At this point, it may be helpful to consider a voice recognition task/job, by way of an example. The device 1 has digitized audio data to process for recognition, for example, which a server instance 81C or 81D may have received from a client 91 executing in a device 19. The work packets sent at S8 include portions of the digitized audio, e.g. sub-divided at apparent speech pauses between words. The neighbor elements process received digital audio data to recognize one or more words in the audio data segments. The returned work result packets represent words of recognized speech. Each returned result may include one or more words, depending on the amount of the audio data sent to the respective neighbor element. The device 1 compiles the received words into a string of words in an order corresponding to the original audio stream (prior to division thereof for work packets).

At S12, the device 1 may simply send the string of words to another element in or communicating with the system for further processing or the like, e.g. back to the client 91 executing in a device 19. Alternatively, the device 1 may itself perform additional processing, e.g. to analyze the word string to recognize a command, in which case the device 1 can act in response to the command or forward the command to another element in or communicating with the system for further processing or the like. As an example of acting in response to the processing result, if the spoken command is a lighting command, the device 1 acting as a controller can then instruct some number of lighting devices 11 to adjust light settings thereof, in the service area where the audio for the spoken command was received as an input by a device 19, based on the command. Alternatively, if device 19 sought processing assistance for recognizing a command with respect to device operations, the device 1 could send the word string to an outside server, or the word string can be sent to the device 19 which then sends the string through networks 16, 61 to the outside server of the vendor or the like associated with the device to determine how the device is to respond and to send back the actual operational command for implementation by the device 19.

Similar processing can be provided with respect to optical input to recognize a gesture and provide an appropriate instruction to the device 19 as to how to respond to a user's gestural input.

As another example, if the recognized command is for obtaining access to other information, e.g. a request for a current quotation of the price of a particular stock, the device 1 can format an appropriate query and send that query to a server for a stock service. In response, the device 1 receives data answering the inquiry, from the stock service server; and the device 1 sends the resulting answer information through the system to an element of the system or a device 19 that initiated the command input. The device 1 acting as a server sends the answer information to the appropriate elements or device in a format for an audio or display output compatible with the features/capabilities of the element or device, for local presentation in the service area where the audio for the spoken information request command was received as an input.

Returning to the exemplary processing flow of FIG. 7, upon completion of the shared resource type distributed processing job, e.g. upon reporting the overall result in S12 in our example, the device 1 will also update its learning table (step S13) to reflect the performance of various other system elements with respect to the just completed job. For example, the table may be updated to reflect devices that did or did not offer resources in response to the query. The learning table may be updated to reflect successful completion by some of the other/neighbor elements versus packets dropped or errors created by processing of sub-tasks by still others of the neighbor elements. As outlined earlier, the device 1 can utilize the learning table updated in step S13 to improve its neighbor selections (e.g. at steps S1-S2 and steps S7-S8) in future distribution of jobs amongst its neighbors.

If sufficient resources are available and/or enough other elements respond, some or all of the work packets sent out at step S8 may be duplicated and sent to two or more of the selected respondent neighbor elements, for redundant processing. When the device 1 compiles the results at S11, it may receive duplicate sub-task processing results. If the device 1 detects errors, in many cases, at least one of the duplicative sub-task processing results may be successful and free of errors; and the device 1 can utilize the error free results and discard the duplicate version that is subject to errors. In some cases, an element that accepted a sub-task may not respond, at least in a timely fashion. From the perspective of device 1, the work packet sent to such an element has been 'dropped.' However, if another element assigned the same sub-task successfully completes its processing of that sub-task, the device 1 can still compile the overall job result using successfully completed sub-task result from that other respondent. Hence, duplicative allocation of sub-tasks can improve likelihood of successful completion of the distributed processing task. However, in some cases, problems may still arise. In any of these cases, the update of the learning table in step S13 will reflect such outcomes with respect to the performance metric data stored in the table relative to the respective neighbor elements.

Assume next that when the device 1 checks results in step S11, and there the device 1 determines that some portion of the job has not been successfully completed. In this situation, the device 1 determines at step S14 that some rework of the job is necessary. If capable, the device 1 may perform any additional processing needed itself. If not, however, then the device can again distribute some or all of the sub-tasks to other system elements. In our illustrated example, depending on the type and/or amount of further data processing required to complete the distributed processing task, processing flows from step S14 back to S1 or S7 and from there through the other steps of the process, essentially as discussed above, to obtain distributed processing results to complete the overall data processing job.

There may be a variety of reasons why a sub-task is not successfully completed, and either the work packet is dropped or the results returned to the device 1 are subject to errors. For example, some communication media may be subject to communication-induced errors too extensive to address with routine error correction technologies. In other cases, some part of the data network of the system 10 may be down or congested. However, in other cases, events at one or more of the selected respondent neighbor elements may result in a dropped work packet, as reflected in our exemplary process flow at steps S15 and S16.

Returning to step S9, the various neighbors that responded, were selected and received work packets are processing data from the packets in accordance with the associated data processing instructions. The overall processing job, and thus the sub-tasks thereof, will have an assigned priority. Other tasks handled by the various intelligent system elements also have assigned priorities. At step S15, one of the system elements that has been processing data from the work packets at S9 now receives (or internally generates) an interrupt in view of an apparent need to perform some other task having a higher priority than the particular distributed processing job. That element will suspend its processing of the allocated sub-task and perform the processing for the higher priority task. Depending on the resources and time taken for the higher priority task, the element may be able to resume sub-task processing after completing processing for the higher priority task and still deliver its sub-task results within the timeframe set for the particular distributed processing job. If not, however, then the system element will drop the processing of the work packet of the particular distributed processing job (step S16), to process the higher priority task. In this later situation, the element will release the promised resources at step S5. After releasing the resources, the neighbor element will update its learning table about distributed processing offered by other elements, as shown at S6. In the interrupt scenario (that passed through S15), for example, the neighbor will update its learned performance metric information about device 1 to reflect that the respondent neighbor element was unable to complete the sub-task before dropping the packet to handle the interrupt for a higher priority task.

Although not discussed in detail, the device 1 may also process some portion data or otherwise perform some sub-task of the distributed job before compiling the results. Alternatively, the device 1 itself may be involved as a respondent neighbor in another distributed processing operation while it waits for responses from the respondent neighbors in the job the device 1 distributed.

Although the discussion of FIG. 7 mainly focused on distributed processing amongst lighting devices, associated user interface devices and sensor devices, as noted earlier, the resource sharing implemented by a process flow like the example of FIG. 7 may take advantage of and share resources of any other type(s) of intelligent elements that are part of or communicating via the lighting system 10. For example, the lighting system 10 may be able to use the memory and/or one or more processors of a cooperative laptop, desktop computer, host/server computer or the like that is coupled to communicate via the data communication media of the lighting system 10. The system also may support communications and/or interactions with a wide range of other devices 19 within the premises 12 having some level of intelligence and having appropriate data communication capabilities. Although we have generally assumed a low processing capability in the other devices and/or that the resource sharing assisted server or other operations on behalf of client devices 19, if any of the other devices 19 have resources to share and are appropriately programmed, the lighting system 10 may be able to use the memories and/or processors of such other cooperative devices. Conversely, some computers coupled to the communication media and/or some other types of cooperative devices may be able (and permitted if appropriate) to request and obtain access to resources of the lighting devices, associated user interface devices and sensor devices available for sharing for distributed processing in a manner like that shown by way of example in FIG. 7.

The intelligent system with wireless communication capabilities is actually more sophisticated than just a deployment of wireless access points, such as WiFi hotspots, in widely spaced lighting devices, e.g. street light fixtures. The systems discussed above deploys wireless data communications nodes (operating at low power) relatively close together and throughout substantial portions or all of a premises. The deployment of numerous low power relatively short range communication nodes can support communication for many electronic devices at the premises.

The wireless deployment may also be adapted to support a variety of other communications, instead of or in addition to any or all of the wireless communications discussed above. For example, depending on the type of wireless technology, the wireless-capable elements of the system may be able to pick-up data from RFID tags within range. As another example, if at least some of the wireless-capable system elements utilize mobile femto or pico cell technology, the lighting system may also provide network connectivity for compatible mobile devices when operating at the premises.

The examples of the wireless communications above focused mainly on implementations using radio frequency type wireless communications. The present concepts, however, encompass systems, system elements and devices using or communicating with the system that implement the wireless communications utilizing other wireless technologies. For example, the wireless communications may use optical communication, e.g. in the visible light spectrum, infrared light, ultraviolet (UV) light or ultrasonic waves. As another example, the wireless communications could be sonic, e.g., with text-to-speech and speech-to-text technology, the lighting system elements and the other devices could talk to each other using human comprehensible language.

Figure 10:
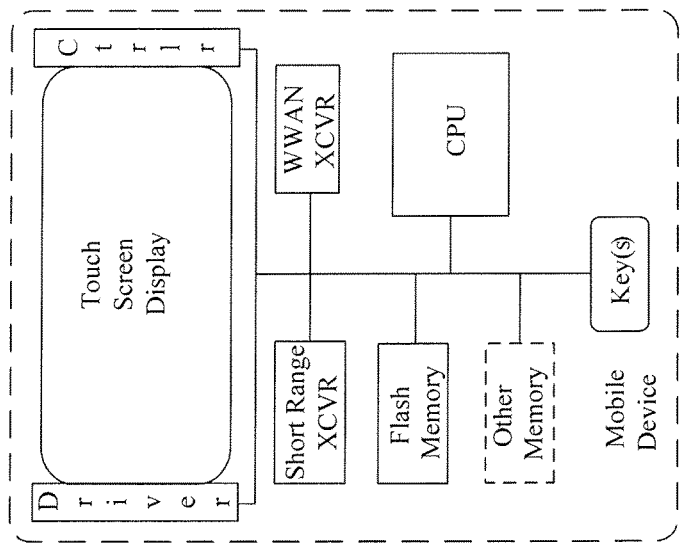
FIG. 10 is a simplified functional block diagram of a mobile device, as an alternate example of a user terminal device, for possible communication in or with the system of FIG. 1.
Figure 9:
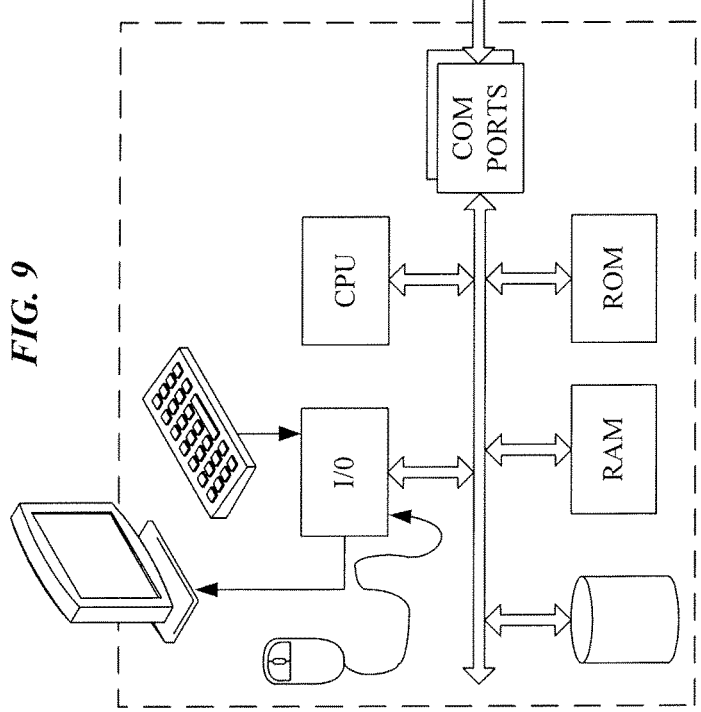
FIG. 9 is a simplified functional block diagram of a personal computer or other user terminal device, which may be used as the remote access terminal, in the system of FIG. 1.
Figure 8:
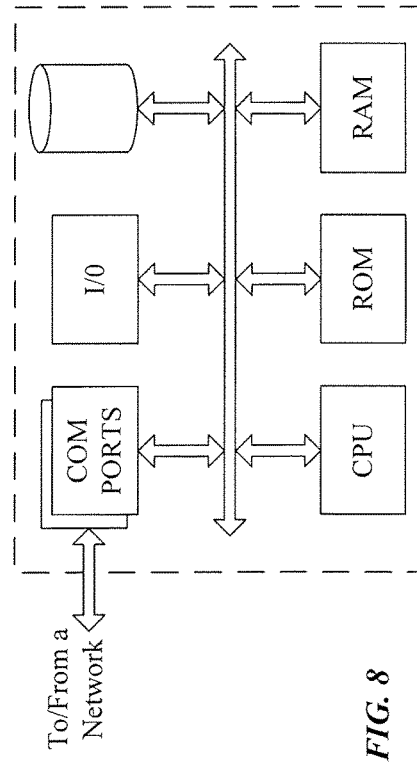
FIG. 8 is a is a simplified functional block diagram of a computer that may be configured as a host or server, for example, to function as the external server or a server if provided at the premises in the system of FIG. 1.

As shown by the above discussion, although many intelligent processing functions of the system 10 are implemented in intelligent lighting system elements 11, 13, 15 or in the other devices 19, at least some functions of devices associated or in communication with the networked lighting system 10 as discussed relative to FIGS. 1-3 may be implemented with general purpose computers or other general purpose user terminal devices, although special purpose devices may be used. FIGS. 8-10 provide functional block diagram illustrations of exemplary general purpose hardware platforms.

FIG. 8 illustrates a network or host computer platform, as may typically be used to implement a host or server, such the computer 63 or server 71. FIG. 9 depicts a computer with user interface elements, as may be used to implement a personal computer or other type of work station or terminal device, such as one of the terminal 65 in FIG. 1, although the computer of FIG. 10 may also act as a server if appropriately programmed. The block diagram of a hardware platform of FIG. 10 represents an example of a mobile device, such as a tablet computer, smartphone or the like with a network interface to a wireless link, which may alternatively serve as a user terminal device like 65. It is believed that those skilled in the art are familiar with the structure, programming and general operation of such computer equipment and as a result the drawings should be self-explanatory.

A server (see e.g. FIG. 8), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 9). A mobile device (see FIG. 10) type user terminal may include similar elements, but will typically use smaller components that also require less power, to facilitate implementation in a portable form factor. The example of FIG. 10 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 8 and the terminal computer platform of FIG. 9 are shown by way of example as using a RAM type main memory and a hard disk drive for mass storage of data and programming, whereas the mobile device of FIG. 10 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 9). The mobile device example in FIG. 10 uses a touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

Although FIGS. 8-10 in their present form show computers and user terminal devices, generally similar configurations also may be used within other elements of the lighting system 10 or within various types of other devices 19. For example, one implementation of the brain, communication and interface elements of a lighting device 11, of a stand-alone sensor 15, of a user interface device 13 or of any of the other devices 19 may utilize an architecture similar to that of one of the computers or mobile terminals. As a more specific example, the personal computer type hardware in FIG. 9 (except for the keyboard, mouse and display) could serve as the brain and communication elements of a lighting device, where the input/output interface I/O would interface to an appropriate light driver and to any sensor(s) or other enhancement input or output device(s) included within the lighting device. As another example of use of an architecture similar to those of FIGS. 8-10 that may be utilized in a system like that of FIG. 1, a lighting controller or other user interface device (UI) might utilize an arrangement similar to the mobile device of FIG. 10, albeit possibly with only one transceiver compatible with the networking technology for the data network 17 of the particular premises 12 (e.g. to reduce costs).

For information about other examples of intelligent lighting devices, which may be suitable for use in a networked lighting system like that of FIG. 1, attention may be directed to U.S. application Ser. No. 13/463,594 Filed May 3, 2012 entitled "LIGHTING DEVICES WITH INTEGRAL SENSORS FOR DETECTING ONE OR MORE EXTERNAL CONDITIONS AND NETWORKED SYSTEM USING SUCH DEVICES," the disclosure of which is entirely incorporated herein by reference.

Although not discussed in detail, a lighting system such as system 10 of FIG. 1 may also support autonomous discovery and commissioning. Such discovery and commissioning may be particularly useful in system set-up, however, some aspects may also apply to allowing other devices to communicate with or through the lighting system. For example, lighting devices and/or other intelligent system elements may be configured to autonomously discover other non-lighting-system devices and commission discovered devices at least to the extent appropriate to permit the access to the system's data network and through that network to the wider area network outside the premises for non-lighting related communications of the other devices. For more information on this topic, attention may be directed to U.S. application Ser. No. 13/903,330, Filed May 28, 2013 entitled "LIGHTING NETWORK WITH AUTONOMOUS COMMISSIONING."

As also outlined above, aspects of the techniques for providing wireless communication access for other devices 19 at the premises 12 and any system interaction therewith, may involve some programming, e.g. programming of the appropriate system elements 11, 13 or 15, devices 19 and/or computers, terminals or the like in communication therewith. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer of the lighting system service provider into any of the lighting devices, sensors, user interface devices, other non-lighting-system devices, etc. of or coupled to the system 10 at the premises 12, including both programming for individual element functions and programming for distributed processing functions. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an"

does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting system, comprising:
a data network configured to enable data communication within a premises and to provide data communication access to a wide area network extending outside the premises; and
lighting system elements, including:
a lighting device comprising a light source, and
either a user interface device configured for lighting control or a lighting-related sensor including a detector,
each of the lighting system elements comprising:
a communication interface system, including a first communication interface, configured to enable communication via a link to the data network; and
a processor coupled to communicate via the communication interface system and the link to the data network and configured to control a lighting related operation,
wherein:
the communication interface system of a first lighting system element includes a second communication interface configured to provide wireless coverage via a short range wireless data communication link, separate from the link to the data network, for use by a non-lighting-system device at the premises in range of the short range wireless data communication link of the first lighting system element;
the processor of the first lighting system element is configured to control communications via the communication interface system of the first lighting system element to provide access to the data network and through the data network to the wide area network outside the premises for non-lighting related communications of the non-lighting-system device;
a power of the short range wireless data communication link is set sufficiently low so as to avoid undue interference with a different short range wireless data communication link of a second lighting system element within the premises.

2. The lighting system as in claim 1, wherein the second communication interface is configured to:
provide the short range wireless data communication link in accordance with a wireless data communication standard.

3. The lighting system as in claim 1, wherein at least one lighting system element is further configured to communicate data to/from one of the non-lighting-system device and to perform a processing operation to support an operation of a processor of the non-lighting-system device.

4. The lighting system as in claim 3, wherein the at least one lighting system element is configured to perform the processing operation to support the operation of the processor of the non-lighting-system device in a distributed processing manner using processing and/or memory resources of a subset or all of the lighting system elements.

5. The lighting system as in claim 4, wherein the subset or all of the lighting system elements configured to perform the processing operation in a distributed processing manner comprises:
server programming for execution using the processing resources of the subset or all of the lighting system elements to operate in a distributed processing fashion to implement a server function with respect to the operation of the processor of the non-lighting-system device and to perform server communications with a client executing on the processor of the non-lighting-system device.

6. The lighting system as in claim 1, wherein the data network is an optical fiber network.

7. The lighting system as in claim 1, wherein:
the second communication interface comprises a radio-frequency wireless transceiver;
the short range wireless data communication link comprises a radio-frequency wireless link;
the first communication interface comprises a radio-frequency wireless transceiver;
the link to the data network comprises a radio-frequency wireless link; and
the data network is a radio-frequency wireless network.

8. The lighting system as in claim 1, wherein the lighting device is a street light fixture.

9. The lighting system as in claim 1, wherein a subset or all of the lighting system elements are in a plurality of service areas of the premises configured to provide short range wireless data communication links for use by non-lighting-system devices in each of the service areas of the premises.

10. A lighting device, comprising:
a first communication interface configured to enable communication via a link to a data network of a lighting system at a premises served by the lighting system;
a second communication interface configured to provide wireless coverage via a short range wireless data communication link, separate from the link to the data network, for use by a non-lighting-system device at the premises in range of the short range wireless data communication link of the lighting device; and
a processor configured to control communications via the first and second communication interfaces to provide wireless access to the data network and to provide access through the data network to a wide area network outside the premises for non-lighting related communications of the non-lighting-system device using the short range wireless data communication link;
wherein a power of the short range wireless data communication link is set sufficiently low so as to avoid undue interference with a different short range wireless data communication link of another lighting device within the premises.

11. The lighting device as in claim 10, wherein the second communication interface is configured to:
provide the short range wireless data communication link in accordance with a wireless data communication standard.

12. The lighting device as in claim 10, wherein the first communication interface is configured to connect to an optical fiber as the link to the data network.

13. The lighting device as in claim 10, wherein:
the first communication interface comprises a radio-frequency wireless transceiver; and
the second communication interface comprises a radio-frequency wireless transceiver.

14. The lighting device as in claim 13, wherein the radio-frequency wireless transceiver of the second communication interface is a WiFi transceiver, a Bluetooth transceiver, a Zigbee transceiver, or a pico or femto cell mobile wireless transceiver.

15. The lighting device as in claim 14, wherein the radio-frequency wireless transceiver of the first communication interface is WiFi transceiver or a mobile cellular wireless transceiver.

16. The lighting device as in claim 10, wherein the lighting device is configured as a street light fixture.

17. A system element for operation in a lighting system, the system element comprising:
a lighting related component;
a first communication interface configured to enable communication via a link to a data network of the lighting system at a premises served by the lighting system;
a second communication interface configured to provide wireless coverage via a short range wireless data communication link, separate from the link to the data network, for use by a non-lighting-system device at the premises in range of the short range wireless data communication link of the system element; and
a processor coupled to and configured to:
control the lighting related component to implement at least one lighting related function for the lighting system and coupled to the first and second communication interfaces, and
control communications via the first and second communication interfaces to provide access to the data network of the lighting system and through the data network of the lighting system to a wide area network outside the premises for non-lighting related communications of the non-lighting-system device using the short range wireless data communication link;
wherein a power of the short range wireless data communication link is set sufficiently low so as to avoid undue interference with a different short range wireless data communication link of another system element within the premises.

18. The system element of claim 17, wherein:
the lighting related component comprises a light source; and
the processor is configured to control the light source so as to configure the system element to operate as a lighting device of the lighting system.

19. The system element of claim 18, wherein the system element is configured as a street light fixture.

20. The system element of claim 17, wherein:
the lighting related component comprises a user interface component; and
the processor is coupled to the user interface component and configures the system element to operate as a lighting controller with respect to one or more lighting devices of the lighting system.

* * * * *